(12) United States Patent  
Shiraki et al.

(10) Patent No.: US 7,792,380 B2  
(45) Date of Patent: Sep. 7, 2010

(54) IMAGE PROCESSING DEVICE AND METHOD, RECORDING MEDIUM, AND PROGRAM

(75) Inventors: Hisakazu Shiraki, Kanagawa (JP); Tetsujiro Kondo, Tokyo (JP)

(73) Assignee: Sony Corporation, Tokyo (JP)

( * ) Notice: Subject to any disclaimer, the term of this patent is extended or adjusted under 35 U.S.C. 154(b) by 729 days.

(21) Appl. No.: 11/148,351

(22) Filed: Jun. 9, 2005

(65) Prior Publication Data

US 2005/0281477 A1    Dec. 22, 2005

(30) Foreign Application Priority Data

Jun. 10, 2004    (JP) ................... P2004-173086

(51) Int. Cl.
  *G06K 9/46*    (2006.01)
(52) U.S. Cl. ........................................... 382/255
(58) Field of Classification Search ............. 382/255, 382/263
  See application file for complete search history.

(56) References Cited

U.S. PATENT DOCUMENTS 6,035,059 A * 3/2000 Kurosawa et al. .......... 382/164
6,959,117 B2 * 10/2005 Ratner et al. ............... 382/255
2002/0060739 A1 * 5/2002 Kitamura et al. ............ 348/222
2003/0185424 A1 * 10/2003 Sato et al. .................. 382/118
2004/0057602 A1 * 3/2004 Kondo et al. ............... 382/107

FOREIGN PATENT DOCUMENTS

JP    2000-057339        2/2000
JP    2004208027 A   *   7/2004

* cited by examiner

*Primary Examiner*—Vu Le
*Assistant Examiner*—Tsung-Yin Tsai
(74) *Attorney, Agent, or Firm*—Oblon, Spivak, McClelland, Maier & Neustadt, L.L.P.

(57) ABSTRACT

A user interface unit sets a parameter based on operations of a user, and outputs to a parameter correction unit. The parameter correction unit extracts the feature quantity of pixels in an observation region that corresponds to the value of the parameter, and based on the maximal value of that feature quantity, corrects the parameter specified by the user as the correction parameter. A blurring correction unit corrects input image data based on the correction parameter, and generates image data of the image wherein the blurring has been corrected. The present invention can be applied, for example, to a digital camera.

15 Claims, 33 Drawing Sheets

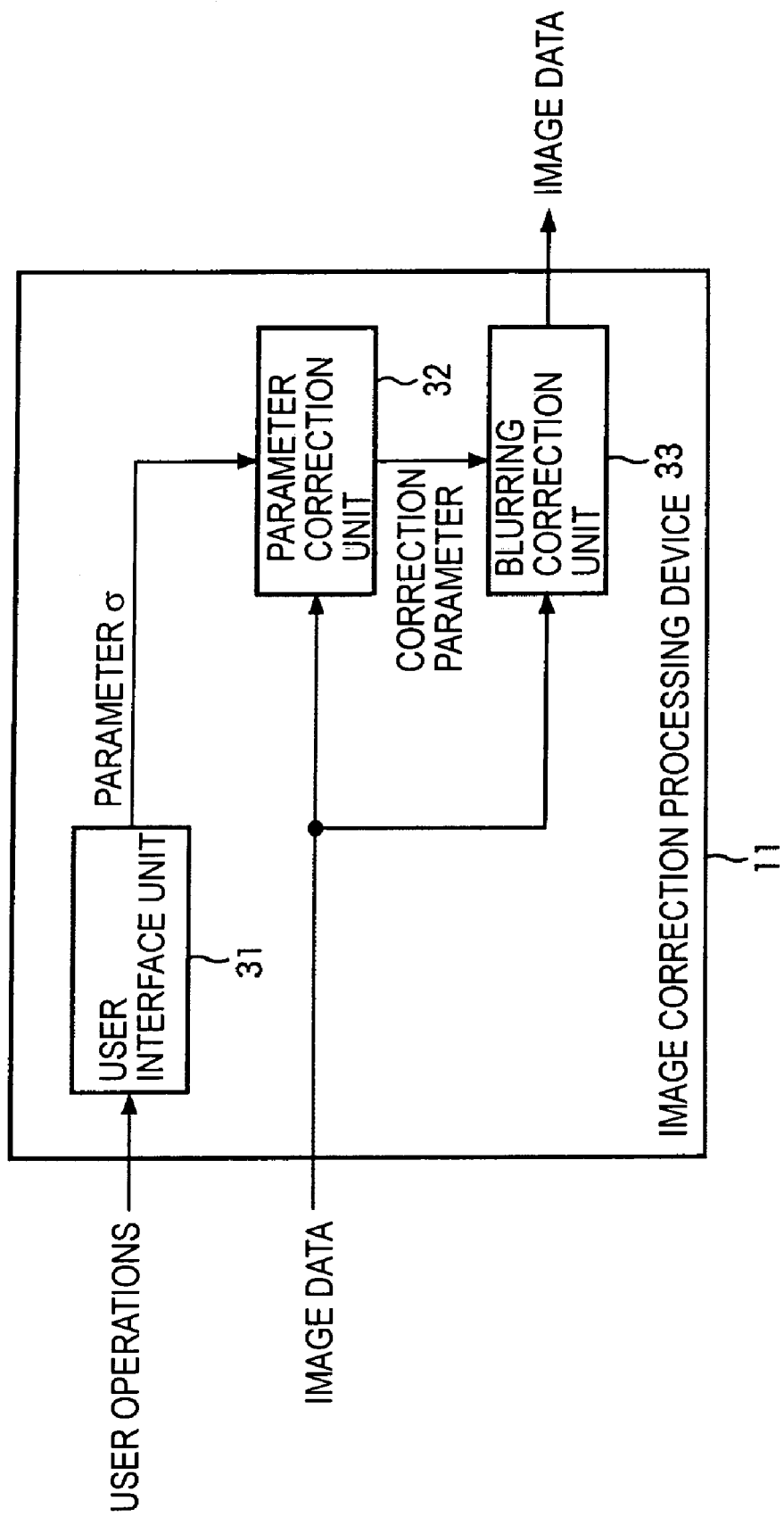

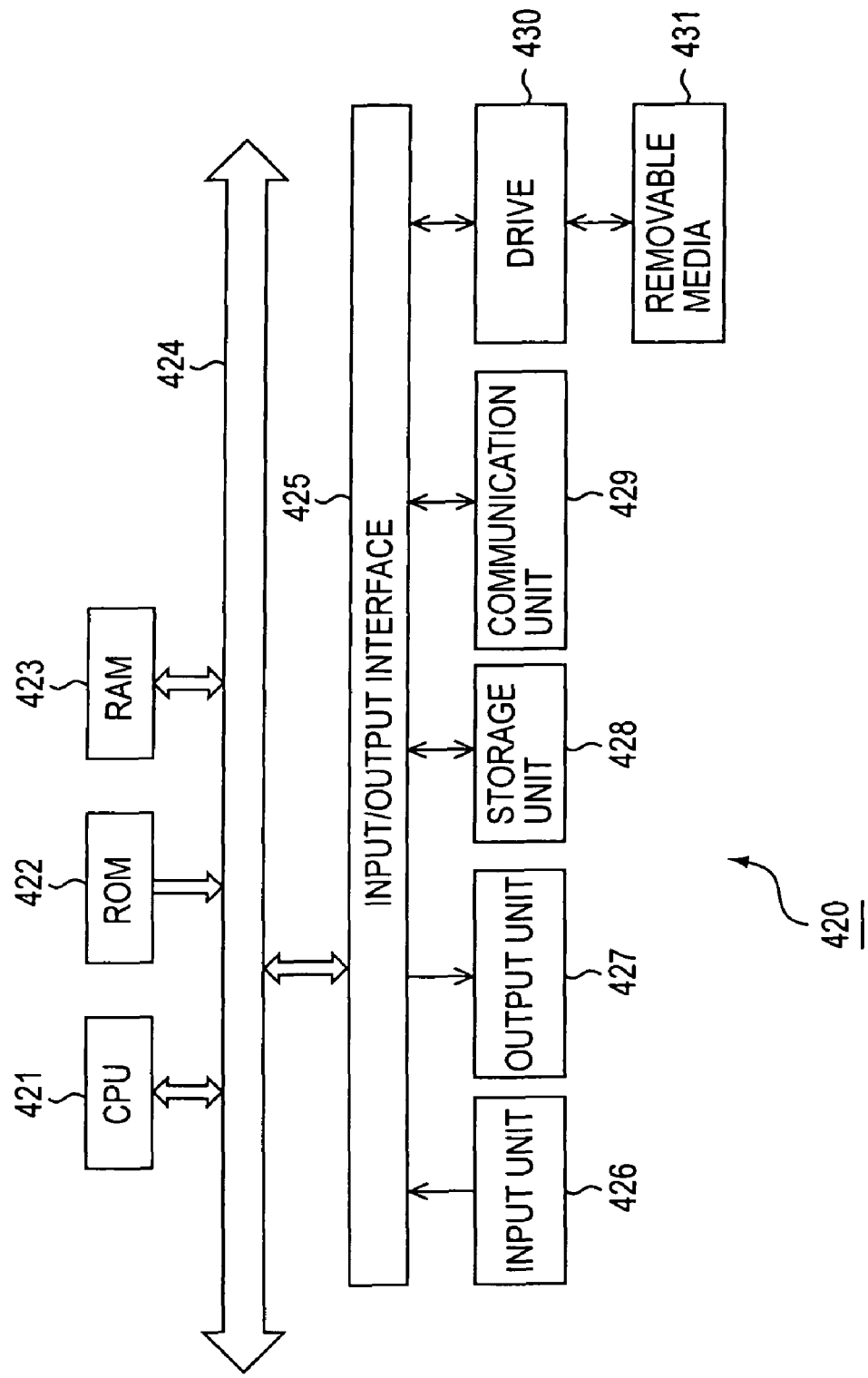

IMAGE PROCESSING DEVICE AND METHOD, RECORDING MEDIUM, AND PROGRAM

CROSS-REFERENCE TO RELATED APPLICATIONS

The present application is related to Japanese Patent Application Nos. JP2004-173086, filed Jun. 10, 2004, and JP2005-159397, filed May 31, 2005. The entire contents of each of the above-identified patents are incorporated herein by reference.

BACKGROUND OF THE INVENTION

1. Field of the Invention

The present invention relates to an image processing device and method, a recording medium, and a program, and specifically relates to an image processing device and method, a recording medium, and a program whereby blurring of an image due to being out of focus can be corrected.

2. Discussion of the Background

Recently, digital cameras have come into widespread use, and opportunities have increased for many users to take photographs. Digital cameras have a so-called auto-focus function, wherein the appropriate focus adjustment is made with regard to a subject by the camera.

However, with the auto-focus function, the focus is adjusted so that the focus condition is optimal at several predetermined points, and therefore, a situation may occur wherein the object that the user desires to photograph is not in focus, with the focus being adjusted on the image of the background, for example. In this case, the image of the object that the user desires to photograph becomes blurred.

Accordingly, a method for correcting such blurring of an image has been proposed in Japanese Unexamined Patent Application Publication No. 2000-57339, for example. However, in the event that processing is performed to correct the blurring of the entire image, for example, the blurring of the image of the main object is corrected, but the drawback is that overshooting or ringing can occur in the background image that was not blurred until that point in time, and the resulting image is of a deteriorated quality.

Now, the invention disclosed in Japanese Unexamined Patent Application Publication No. 2000-57339 involves the user determining the region for blurring to be corrected, and correction processing being performed only in that specified region.

However, if the area of the correcting region is to be determined by the user, in the case that the shape of the main object has a complicated shape, for example, an operation is necessary wherein the periphery of the object with a complicated shape is traced precisely, and this places a great burden on the user.

SUMMARY OF THE INVENTION

The present invention has been made in light of the above problems, and provides for correction of blurring easily without placing a great burden on the user.

According to a first aspect of the present invention, an image processing device comprises: parameter acquiring means for acquiring a parameter relating to correction of blurring of an image to be corrected; feature quantity detecting means for detecting a feature quantity of the image to be corrected; parameter generating means for generating a correction parameter by correcting the parameter based on the feature quantity; and correcting means for correcting the blurring of the image to be corrected based on the correction parameter.

According to a second aspect of the present invention, an image processing method comprises: acquiring a parameter relating to correction of blurring of an image to be corrected; detecting the feature quantity of the image to be corrected; generating a correction parameter by correcting the parameter based on the feature quantity; and correcting the blurring of the image to be corrected based on the correction parameter.

According to a third aspect of the present invention, a recording medium that stores a program configured to be read by a computer, the program comprises: instructions for acquiring a parameter relating to correction of blurring of an image to be corrected; instructions for detecting the feature quantity of the image to be corrected; instructions for generating a correction parameter by correcting the parameter based on the feature quantity; and instructions for correcting the blurring of the image to be corrected based on the correction parameter.

According to a fourth aspect of the present invention, an image processing device comprises: a user interface unit configured to acquire a parameter relating to correction of blurring of an image to be corrected; a feature quantity detecting unit configured to detect a feature quantity of the image to be corrected; a parameter correction unit configured to generate a correction parameter by correcting the parameter based on the feature quantity; and a blurring correction unit configured to correct the blurring of the image to be corrected based on the correction parameter.

According to a fifth aspect of the present invention, an image processing device comprises: acquiring means for acquiring image data for learning; specifying means for specifying a parameter for generating blurring in an image; generating means for generating image data of the image, wherein the blurring occurred using a function including the parameter for the acquired image data; feature quantity detecting means for detecting a feature quantity of the image of the generated image data; maximal value detecting means for detecting a maximal value of the feature quantity of the image, wherein the blurring occurred that corresponds to the specified parameter; and creating means for creating a table, from which is read out a correction parameter that corresponds to the specified parameter and the specifying feature quantity when the specifying parameter and the specifying feature quantity is specified, and in a case that the specifying feature quantity is smaller than the maximal value of the feature quantity that corresponds to the specified parameter, the specified parameter is made to be the correction parameter, and in a case that the specifying feature quantity is greater, the parameter that corresponds as the feature quantity wherein the value is greater than the specifying feature quantity as the maximal value of the feature quantity is made to be the correction parameter.

According to a sixth aspect of the present invention, an image processing method comprises: acquiring image data for learning; setting the parameter for generating blurring on an image; generating image data of the image wherein the blurring occurred using a function including the parameter for the acquired image data; detecting a feature quantity of the image of the generated image data;

detecting a maximal value of the feature quantity of the image wherein the blurring occurred that corresponds to the set parameters; and creating a table from which is read out a correction parameter that corresponds to the specifying parameter and the specifying feature quantity when the specifying parameter and the specifying feature quantity is specified, and in a case that the specifying feature quantity is smaller than the maximal value of the feature quantity that corresponds to the specifying parameter, the specifying parameter is made to be the correction parameter, and in a case that the specifying feature quantity is greater, the parameter that corresponds as the feature quantity wherein the value is greater than the specifying feature quantity as the maximal value of the feature quantity is made to be the correction parameter.

According to a seventh aspect of the present invention, a recording medium for recording a program configured to be read by a computer, the program comprises: instructions for acquiring image data for learning; instructions for setting the parameter for generating blurring on an image;

instructions for generating image data of the image wherein the blurring occurred using a function including the parameter for the acquired image data; instructions for detecting a feature quantity of the image of the generated image data; instructions for detecting a maximal value of the feature quantity of the image wherein the blurring occurred that corresponds to the set parameters; and instructions for creating a table from which is read out a correction parameter that corresponds to the specifying parameter and the specifying feature quantity when the specifying parameter and the specifying feature quantity is specified, and in a case that the specifying feature quantity is smaller than the maximal value of the feature quantity that corresponds to the specifying parameter, the specifying parameter is made to be the correction parameter, and in a case that the specifying feature quantity is greater, the parameter that corresponds as the feature quantity wherein the value is greater than the specifying feature quantity as the maximal value of the feature quantity is made to be the correction parameter.

According to a eighth aspect of the present invention, an image processing device comprises: an acquiring unit configured to acquire image data for learning; a setting unit configured to specify a parameter for generating blurring in an image; a computing unit configured to generate image data of the image, wherein the blurring occurred using a function including the parameter for the acquired image data; a feature quantity detecting unit configured to detect a feature quantity of the image of the generated image data; a maximal value search unit configured to detect a maximal value of the feature quantity of the image, wherein the blurring occurred that corresponds to the specified parameter; and a table creating unit configured to create a table, from which is read out a correction parameter that corresponds to the specified parameter and the specifying feature quantity when the specifying parameter and the specifying feature quantity is specified, and in a case that the specifying feature quantity is smaller than the maximal value of the feature quantity that corresponds to the specified parameter, the specified parameter is made to be the correction parameter, and in a case that the specifying feature quantity is greater, the parameter that corresponds as the feature quantity wherein the value is greater than the specifying feature quantity as the maximal value of the feature quantity is made to be the correction parameter.

According to the first to the fourth aspect of the present invention, the blurring of an image can be corrected. Specifically, according to the present invention, the blurring of an image can be corrected easily without placing a particular burden on the user.

According to the fifth to the eighth aspect of the present invention, a table can be created wherein the parameters for correcting an image are listed. Specifically, a table can be created wherein the parameters for easily correcting an image, without placing a particular burden on the user, are listed.

BRIEF DESCRIPTION OF THE DRAWINGS

FIG. 10 is a block diagram illustrating a configuration example of the image correction processing device of FIG. 1;

FIG. 35 is a block diagram illustrating a configuration example of a personal computer.

DESCRIPTION OF THE PREFERRED EMBODIMENTS

The preferred embodiments of the present invention will be described below, and the corresponding relationship between the invention disclosed and the embodiments thereof is as follows. Even in the event that an embodiment is described in the specification but is not described as being an embodiment that is applicable to the invention, this does not necessarily mean that the embodiment is not applicable to the invention. Conversely, even in the event that an embodiment is described here as being applicable to the invention, that does not mean that this embodiment is not applicable to an invention other than this invention.

Further, this description does not mean the invention in its entirety that is described in the specification. In other words, this description is the invention that is described in the specification, and is not to deny any invention that is not claimed in this application, that is, any additional inventions occurring due to future filing of divisional applications or occurring due to filing of amendments.

Figure 12:
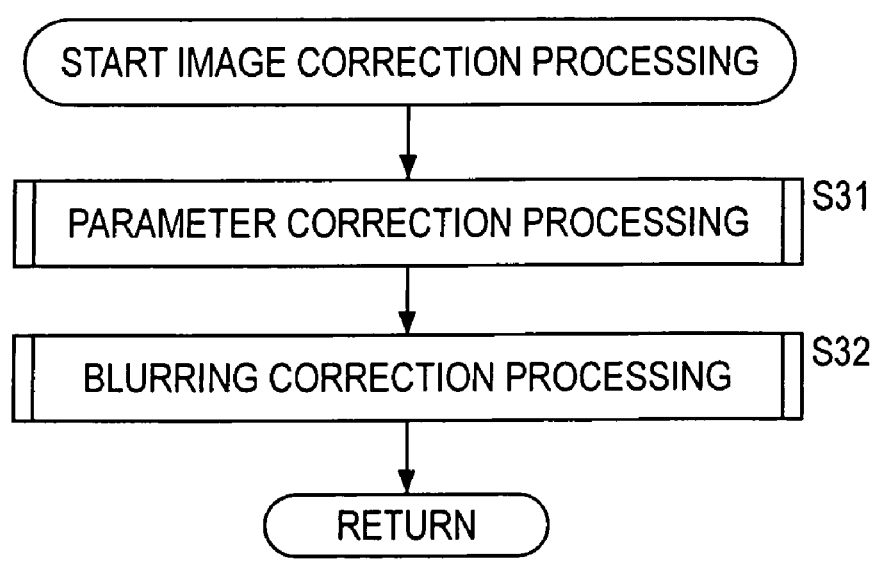
FIG. 12 is a flowchart describing the image correction processing of the image correction processing device of FIG. 10.
Figure 13:
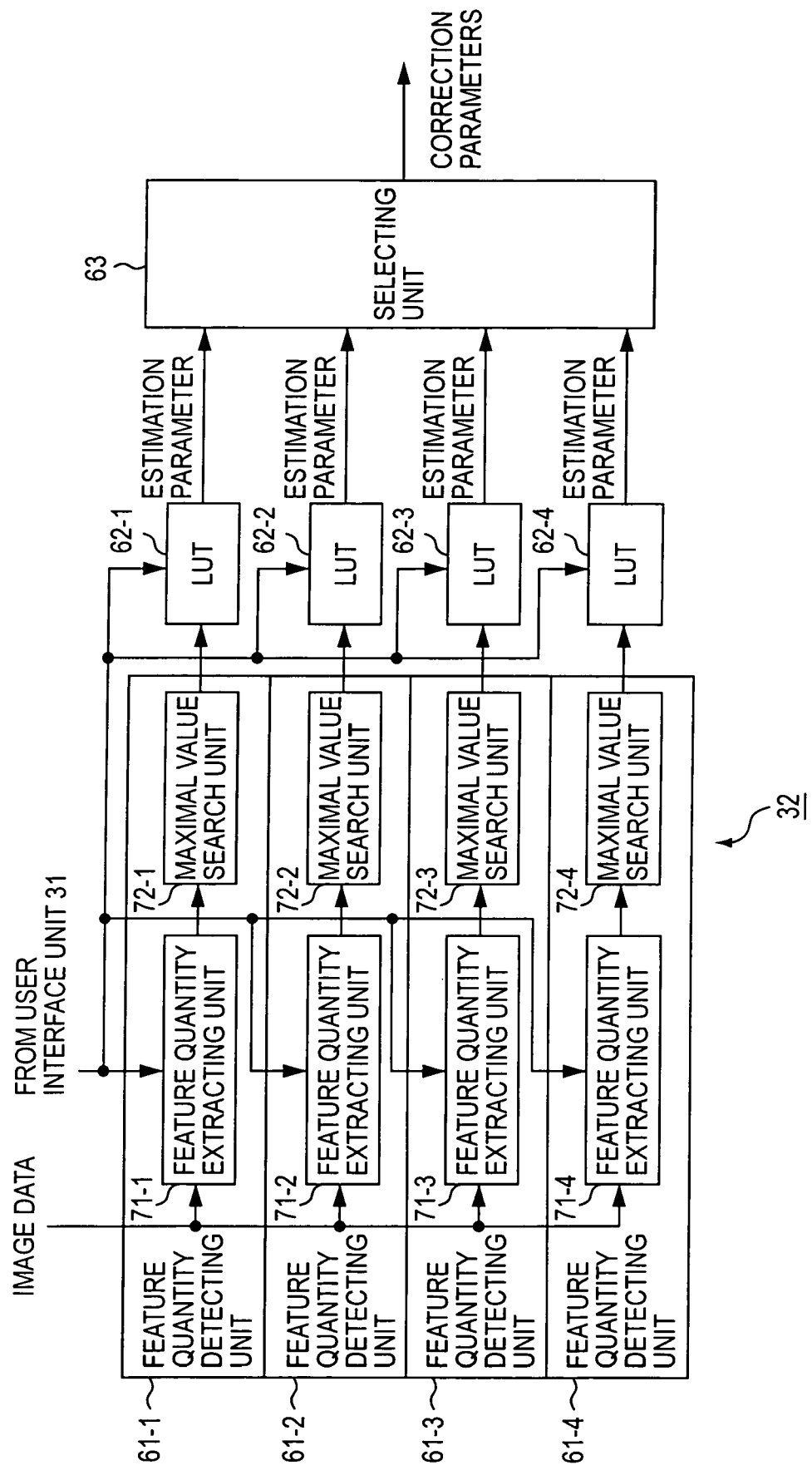
FIG. 13 is a block diagram illustrating a functional configuration example of the parameter correction unit of FIG. 10.
Figure 14:
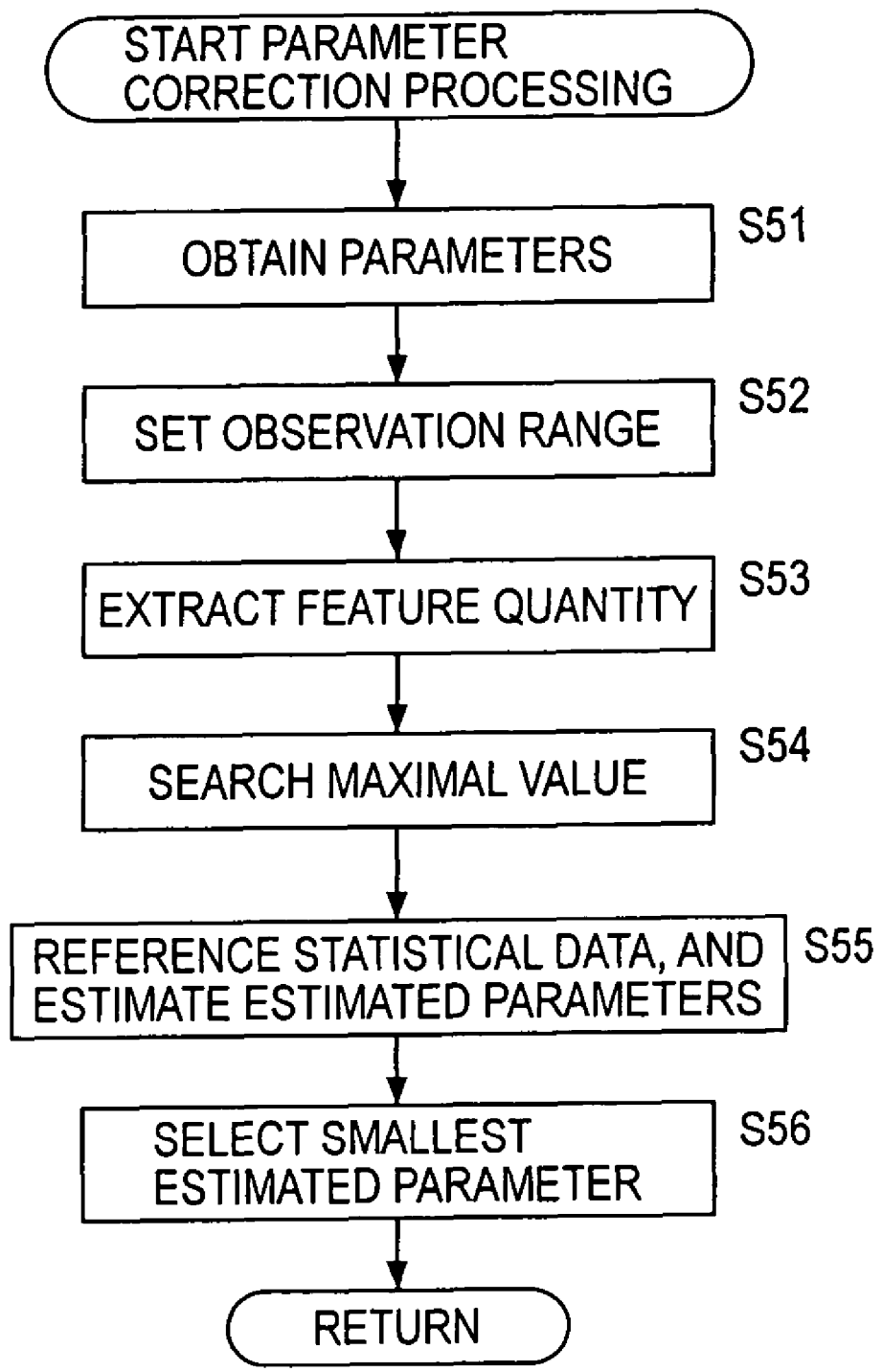
FIG. 14 is a flowchart that describes the parameter correction processing in Step S31 of FIG. 12.

The image processing device according to the first aspect of the present invention comprises parameter acquiring means (for example, a user interface unit 31 in FIG. 10 that executes the processing of step S51 in FIG. 14) for acquiring a parameter (for example, parameter σ) for correcting the blurring of the image to be corrected, feature quantity detecting means (for example, the feature quantity detecting units 61-1 through 61-4 of FIG. 13 that execute the processing of steps S52 and S53 of FIG. 14) for detecting the feature quantity of the image to be corrected (for example, a primary differential value, a secondary differential value, a dynamic range, or a dispersion), parameter generating means (for example, the look-up tables 62-1 through 62-4 in FIG. 13 that execute the processing of step S55 in FIG. 14) for generating a correction parameter by correcting the parameter based on the feature quantity, and correcting means (for example, a blurring correction unit 33 in FIG. 10 that executes the processing of step S32 in FIG. 12) for correcting the blurring of the image to be corrected based on the correction parameter.

Figure 16:
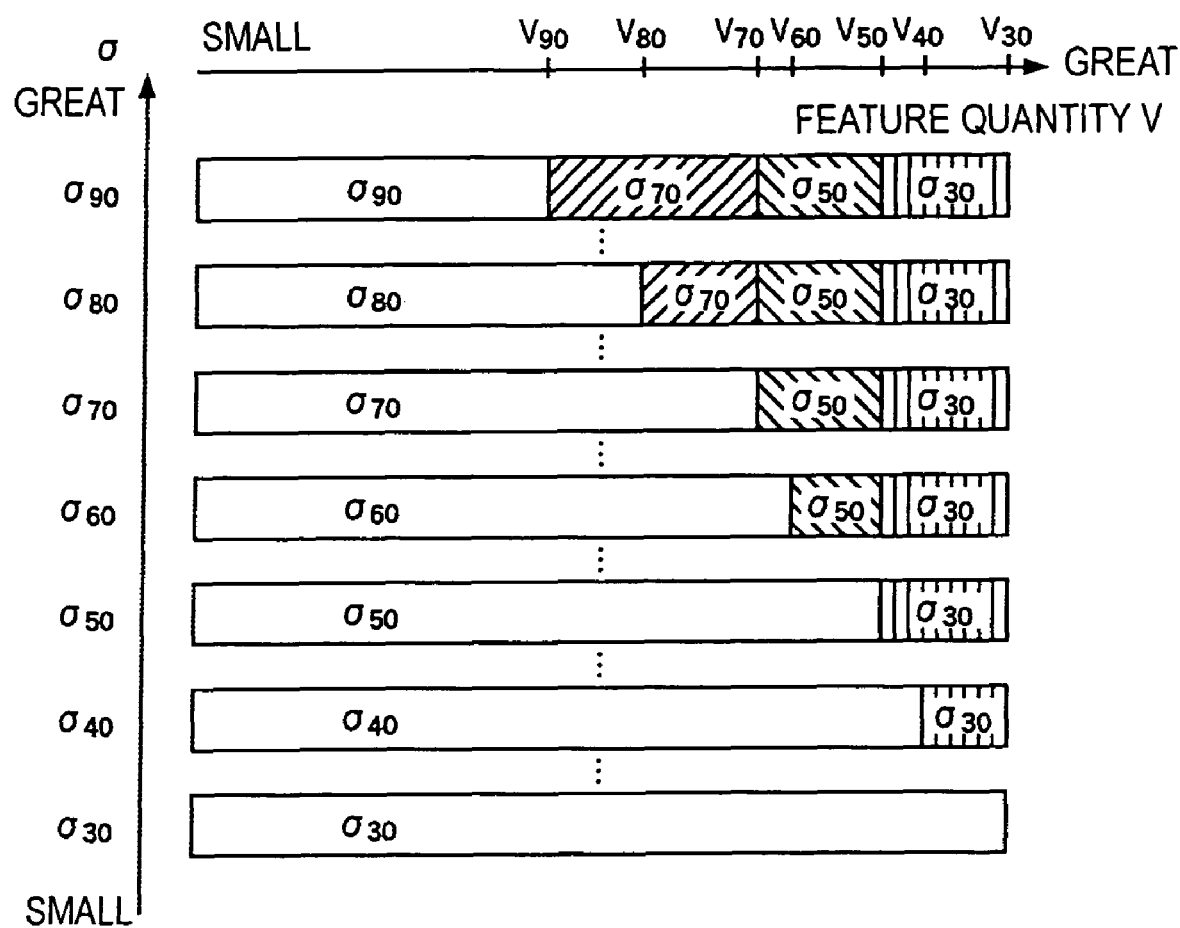
FIG. 16 is a diagram illustrating an example of a look-up table.
Figure 19:
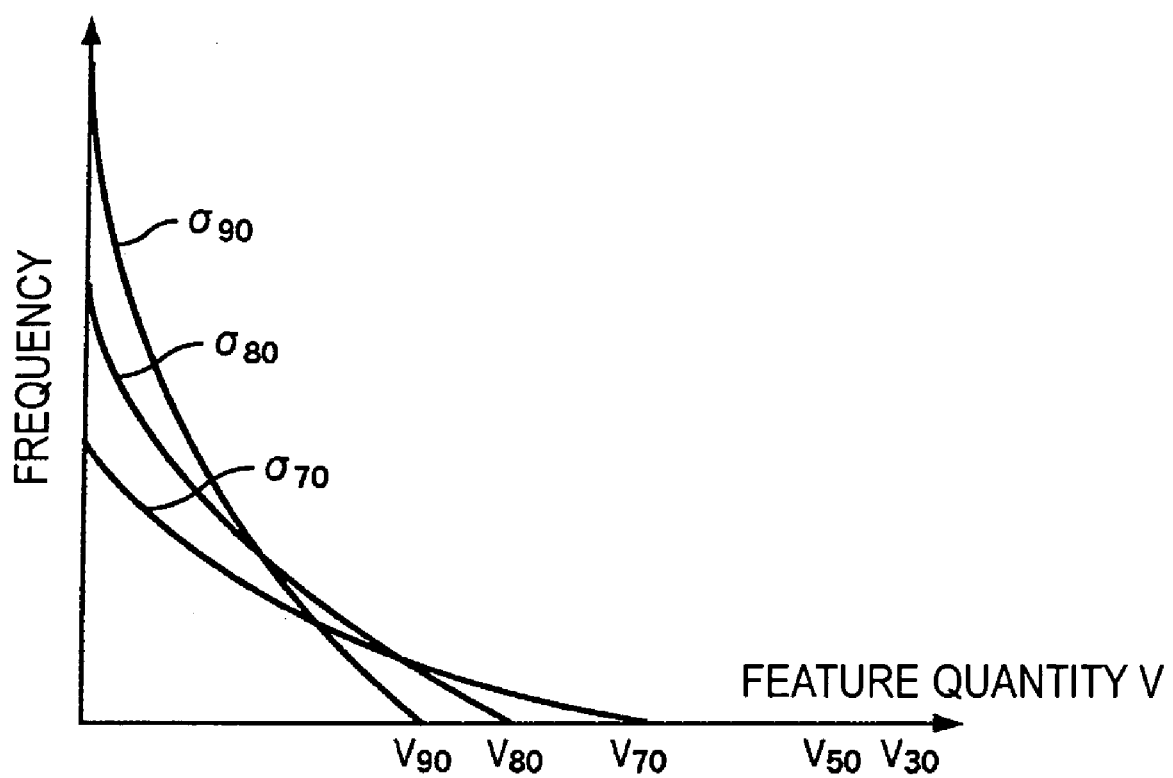
FIG. 19 is a diagram describing the relationship between the feature quantity, the frequency, and the parameter σ.
Figure 20:
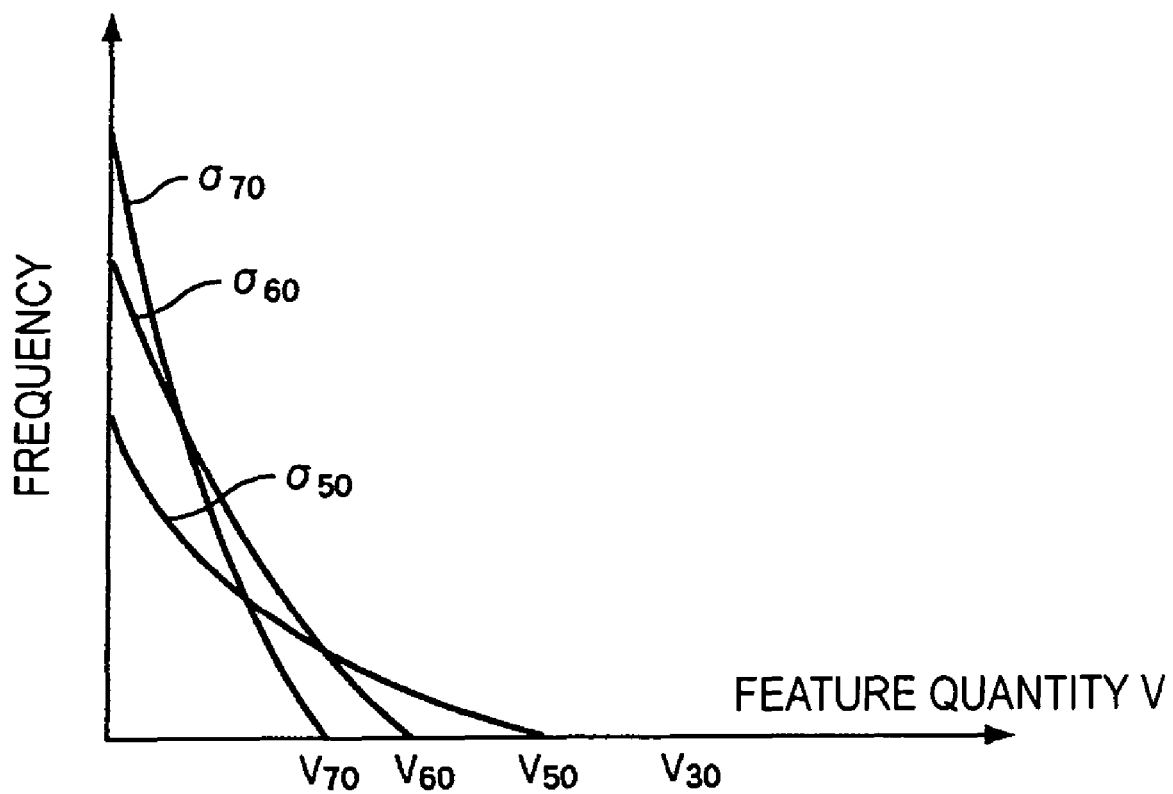
FIG. 20 is a diagram describing the relationship between the feature quantity, the frequency, and the parameter σ.

In the case that the first feature quantity (for example, the feature quantity $V_{80}$ in FIG. 19) as the maximal value of the feature quantity of the image to be corrected is smaller than the second feature quantity (for example, the feature quantity $V_{70}$ in FIG. 20) as the maximal feature quantity that corresponds to the acquired parameter (for example, the parameter $\sigma_{70}$ in FIG. 20) (for example, in the case that the first feature quantity is the feature quantity $V_{80}$ in FIG. 16), the parameter generating means takes the acquired parameter (for example, the parameter $\sigma_{70}$ in FIG. 16) as the correction parameter without change (for example, as the parameter $\sigma_{70}$ listed as the correction parameter in the space that corresponds to the parameter $\sigma_{70}$ on the vertical coordinate axis in FIG. 16), and in the case that it is larger (for example, in the case that the first feature quantity is the feature quantity $V_{60}$ in FIG. 20), the parameter that corresponds as the maximal feature quantity of the third feature quantity (for example, the feature quantity $V_{50}$ in FIG. 20) as a feature quantity greater than the first feature quantity (for example, the parameter $\sigma_{50}$ in FIG. 20), is taken as the correction parameter (for example, the correction parameter in the spaces that corresponds to the parameter $\sigma_{70}$ on the vertical coordinate axis in FIG. 16 is taken as the parameter $\sigma_{50}$).

The feature quantity detecting means detects the multiple feature quantities, and the parameter generating means generates the multiple correction parameters corresponding to the multiple feature quantities; and the image processing device further comprises correction parameter selection means (for example, the selecting unit 63 in FIG. 13 that executes the processing of step S56 in FIG. 14) that selects the smallest of the multiple correction parameters; and the correcting means corrects the blurring of an image to be corrected based on the selected correction parameter.

The feature quantity detecting means (for example, the feature quantity extracting units 71-1 through 71-4 that configure the feature quantity detecting units 61-1 through 61-4 in FIG. 13) detects the maximal value of the feature quantity of the multiple pixels within one portion of the region of the image to be corrected as the feature quantity (for example, the processing of step S54 in FIG. 14).

The correcting means sets the one portion of the region of the image to be corrected (for example, the observation region in FIG. 15) to the size based on the acquired value of the parameter (for example, the processing of step S52 in FIG. 14).

Figure 23:
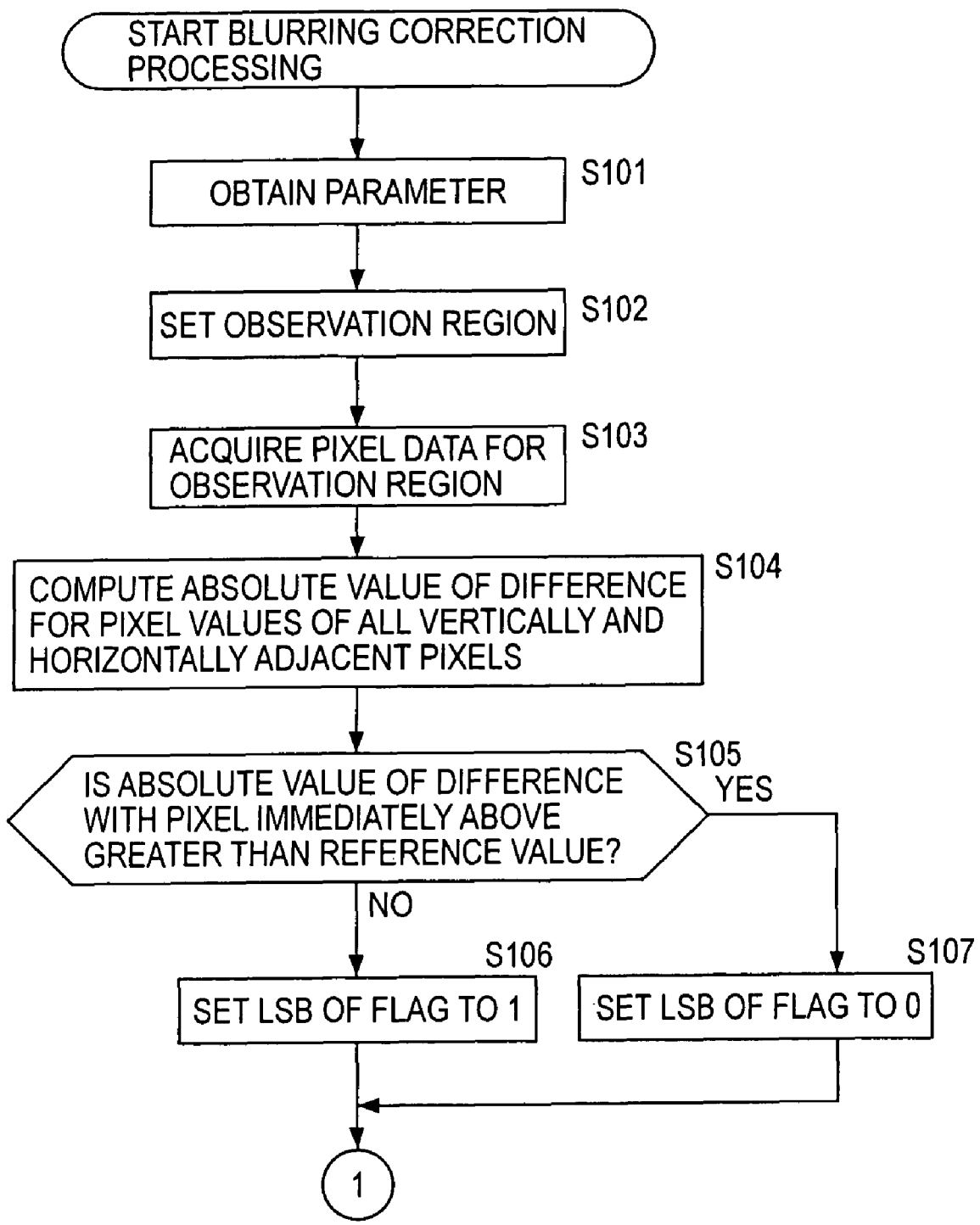
FIG. 23 is a flowchart describing the blurring correction processing of the blurring correction unit of FIG. 22.

The correcting means performs computation to correct the blurring of an image to be corrected, using the difference (for example, the absolute-value-of-differences) between the pixel values of adjacent pixels (for example, the processing of step S104 in FIG. 23).

Figure 24:
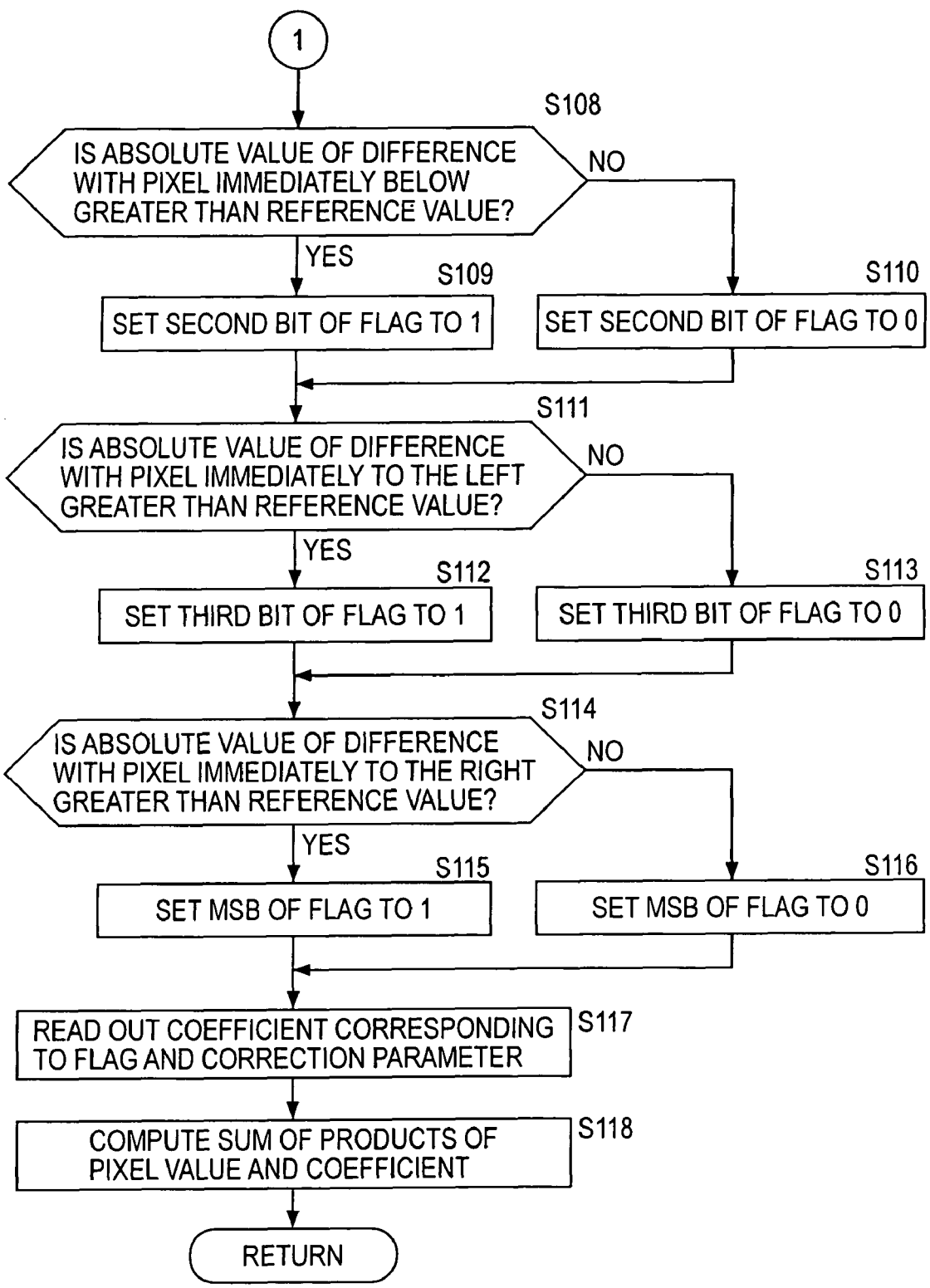
FIG. 24 is a flowchart describing the blurring correction processing of the blurring correction unit of FIG. 22.

The correcting means compares the difference with the reference value and determines the edge direction (for example, the processing of steps S105, S108, S111, and S114 in FIGS. 23 and 24), and the difference of the direction that has the edge is utilized by a smaller proportion as compared to the difference of the direction without an edge (for example, the processing of steps S106, S107, S109, S110, S112, S113, S115, and S116 in FIGS. 23 and 24).

The image processing method according to the second aspect of the present invention, and the program for a recording medium according to the third aspect of the present invention comprise: a parameter acquiring step (for example, step S51 in FIG. 14) for acquiring a parameter (for example, parameter σ) relating to correcting of blurring of the image to be corrected; a feature quantity detecting step (for example, steps S52 and S53 in FIG. 14) for detecting the feature quantity (for example, the primary differential value, the secondary differential value, the dynamic range, and the dispersion of the image data) of the image of the feature quantity; a parameter generating step (for example, step S55 in FIG. 14) for generating a correction parameter by correcting the parameter based on the feature quantity; and a blurring correcting step (for example, step S32 in FIG. 12) for correcting the blurring of the image to be corrected based on the correction parameter.

The image processing device according to the fifth aspect of the present invention comprises: acquiring means (for example, an acquiring unit 211 in FIG. 28 that executes the processing of step S151 in FIG. 29) for acquiring image data for the purpose of learning; setting means (for example, a setting unit 213 in FIG. 29 that executes the processing of step S152 in FIG. 29) for setting a parameter for generating blurring in an image; generating means (for example, a computing unit 212 in FIG. 28 that executes the processing of step S153 in FIG. 29) for generating image data of the image by generating blurring using a function (for example, the Gauss function in Equation (2)) including the parameter for the acquired image data; feature quantity detecting means (for example, a feature quantity extracting unit 214 in FIG. 28 that executes the processing of step S154 in FIG. 29) for detecting the feature quantity of the image of the image data that was generated (for example, a primary differential value, a secondary differential value, a dynamic range, or a dispersion); maximal value detecting means (for example, a maximal value detecting unit 216 in FIG. 28 that executes the processing of step S156 in FIG. 29) for detecting the maximal value of the feature quantity of the image wherein blurring was generated corresponding to the set parameters; and creating means (for example, a table creating unit 217 in FIG. 28 that executes the processing of step S157 in FIG. 29) that creates a table, wherein the table (for example, the look-up table in FIG. 16) from which is read out the correction parameter that corresponds to a specifying parameter and a specifying feature quantity upon the specifying parameter and the specifying feature quantity (for example, the vertical axis parameter σ and the horizontal axis feature quantity V serving as the address of the look-up table in FIG. 16) being specified, and in the case that the specifying feature quantity is smaller (for example, in the case that the specified feature quantity is the feature quantity $V_{90}$ in FIG. 16) than the maximal value of the feature quantity (for example, the feature quantity $V_{80}$ in FIG. 19) that corresponds to the specifying parameter (for example, the parameter $\sigma_{80}$ as the specified value in FIG. 16), the specifying parameter is taken as the correction parameter (for example, as the parameter $\sigma_{80}$ listed as the correction parameter in the space that corresponds to the parameter $\sigma_{80}$ on the vertical coordinate axis of the look-up table in FIG. 16), and in the case that it is greater (for example, in the case that the specified feature quantity is the feature quantity $V_{60}$ in FIG. 16), the parameter (for example, the parameter $\sigma_{50}$ in FIG. 17) that corresponds as the feature quantity (for example, the feature quantity $V_{50}$ in FIG. 16) wherein the value is greater than the specifying feature quantity as the maximal value of the feature quantity, is taken as the correction parameter (for example, as the parameter $\sigma_{50}$ as the correction parameter in the space that corresponds to the parameter $\sigma_{70}$ on the vertical coordinate axis of the look-up table in FIG. 16).

Frequency detecting means (for example, a frequency detecting unit 215 in FIG. 28 that executes the processing of step S155 in FIG. 29) for detecting the frequency of the feature quantity is further comprised, wherein the maximal value detecting means detects the maximal value of the feature quantity from the feature quantities that are greater than the predetermined threshold value of the detected frequency.

The image processing method according to the sixth aspect of the present invention, and the program for a recording medium according to the seventh aspect of the present invention comprise: an acquiring step (for example, step S151 in FIG. 29) for acquiring the image data for the purpose of learning; a setting step (for example, step S152 in FIG. 29) for setting the parameter for generating blurring in an image; a generating step (for example, step S153 in FIG. 29) for generating image data of the image by generating blurring using a function (for example, the Gauss function in Equation (2)) including the parameter for the acquired image data; a feature quantity detecting step (for example, step S154 in FIG. 29) for detecting the feature quantity of the image of the image data that was generated (for example, a primary differential value, a secondary differential value, a dynamic range, or a dispersion of the image data); a maximal value detecting step (for example, step S156 in FIG. 29) for detecting the maximal value of the feature quantity of the image wherein blurring was generated corresponding to the set parameters; and a creating step (for example, step S157 in FIG. 29) that creates a table, wherein, the table (for example, the look-up table in FIG. 16) from which is read out the correction parameter that corresponds to a specifying parameter and a specifying feature quantity upon the specifying parameter and the specifying feature quantity (for example, the vertical axis parameter σ and the horizontal axis feature quantity V serving as the address of the look-up table in FIG. 16) being specified, and in the case that the specifying feature quantity is smaller (for example, in the case that the specified feature quantity is the feature quantity $V_{90}$ in FIG. 16) than the maximal value of the feature quantity (for example, the feature quantity $V_{80}$ in FIG. 19) that corresponds to the specifying parameter (for example, the parameter $\sigma_{80}$ as the specified value in FIG. 16), the specifying parameter is taken as the correction parameter (for example, as the parameter $\sigma_{80}$ listed as the correction parameter in the space that corresponds to the parameter $\sigma_{80}$ on the vertical coordinate axis of the look-up table in FIG. 16), and in the case that it is greater (for example, in the case that the specified feature quantity is the feature quantity $V_{60}$ in FIG. 16), the parameter (for example, the parameter $\sigma_{50}$ in FIG. 17) that corresponds as the feature quantity (for example, the feature quantity $V_{50}$ in FIG. 16) wherein the value is greater than the specifying feature quantity as the maximal value of the feature quantity is taken as the correction parameter (for example, as the parameter $\sigma_{50}$ as the correction parameter in the space that corresponds to the parameter $\sigma_{70}$ on the vertical coordinate axis of the look-up table in FIG. 16).

Next, the embodiments applicable to the present invention will be described while referencing the figures.

Figure 1:
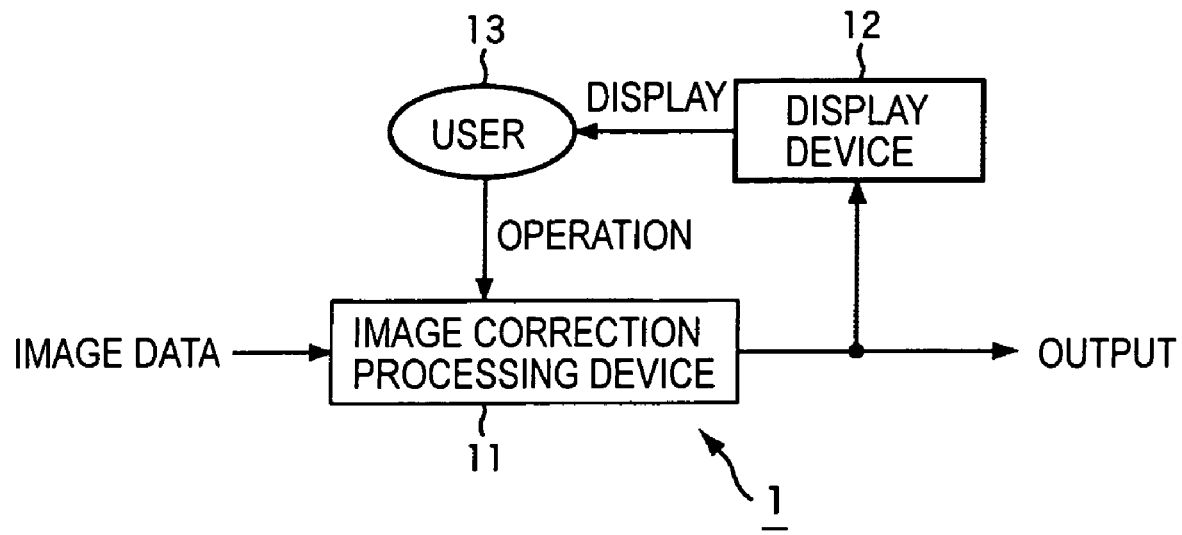
FIG. 1 is a block diagram illustrating a configuration example of the image processing device to which the present invention is applied.

FIG. 1 illustrates a configuration example of an image processing device to which the present invention is applied. This image processing device 1 comprises an image correction processing device 11 and a display device 12. The image correction processing device 11 corrects and outputs the input blurring of the image of the image data. The display device 12 displays an image based on the image data that is output by the image correction processing device 11, and shows this to a user 13.

Figure 2:
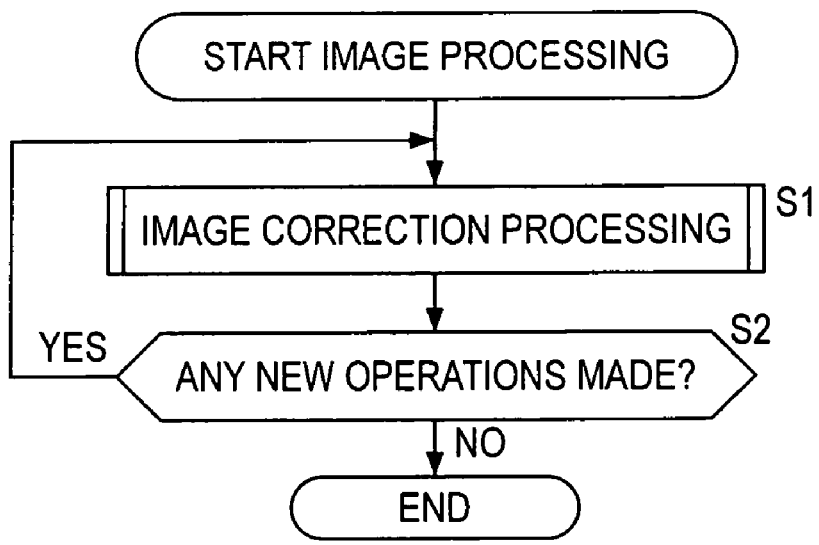
FIG. 2 is a flowchart describing the image processing of the image processing device of FIG. 1.

Next, the image processing of this image processing device 1 will be described with reference to the flowchart in FIG. 2. The following embodiment is directed to image processing for the correction of blurring to due out-of-focus conditions.

In step S1, the image correction processing device 11 performs image correction processing. The details thereof will be described below referencing FIG. 12. The image correction processing device 11 performs correction processing corresponding to the parameter σ, that is specified by the user 13, to the input image data, and outputs the image data after correction processing. This image data is output to a device not shown at a later step, and is also provided to the display device 12, and is displayed as an image.

The user 13 views the image that is displayed on the display device 12, determines whether or not the blurring has been sufficiently corrected, and in the case that the blurring is not yet sufficiently corrected, adjusts the knobs and so forth so as to change the value of the parameter σ to a different value.

Then, in step S2, the image correction processing device 11 determines whether or not a new operation has been performed by the user, and in the case that a new operation has been performed, the process returns to step S1, and the image correction processing is performed based on the new parameter signal that has been set again.

An image based on the corrected image data is displayed by the display device 12, and therefore the user 13 views this image again, and determines whether or not to further adjust the movement of the image. Then, further, in the case that the user determines the necessity of correcting the blurring, a new parameter σ value can be set by adjusting the knob.

Processing such as that described above is repeatedly executed. Then, in step S2, in the case that a new operation is determined not to have been performed, the processing ends.

Next, the principle of the image correcting in the image correction processing device 11 will be described. With the present invention, a model based on the following Equation is postulated regarding the occurrence of blurring.

$$Y(x, y) = \sum_{\substack{-r<i<r \\ -r<j<r}} [W(i, j) \times X(x+i, y+j)] \quad (1)$$

The X (x+i, y+j) in the above Equation represents the image data wherein blurring of the coordinate X (x+i, y+j) has not occurred, and by convoluting the value wherein this is multiplied by a weighted coefficient W(i, j), the image data Y (x, y) wherein blurring has occurred is generated. The weighted coefficient W(i, j) is thus a Gaussian function, as illustrated by the following Equation.

$$W(j, i) = \frac{1}{2\pi\sigma^2} e^{\frac{j^2+i^2}{-2\sigma}} \quad (2)$$

The parameter σ is a parameter corresponding with the blurring, and the greater the value of the parameter σ becomes, the greater the blurring becomes.

Figure 3:
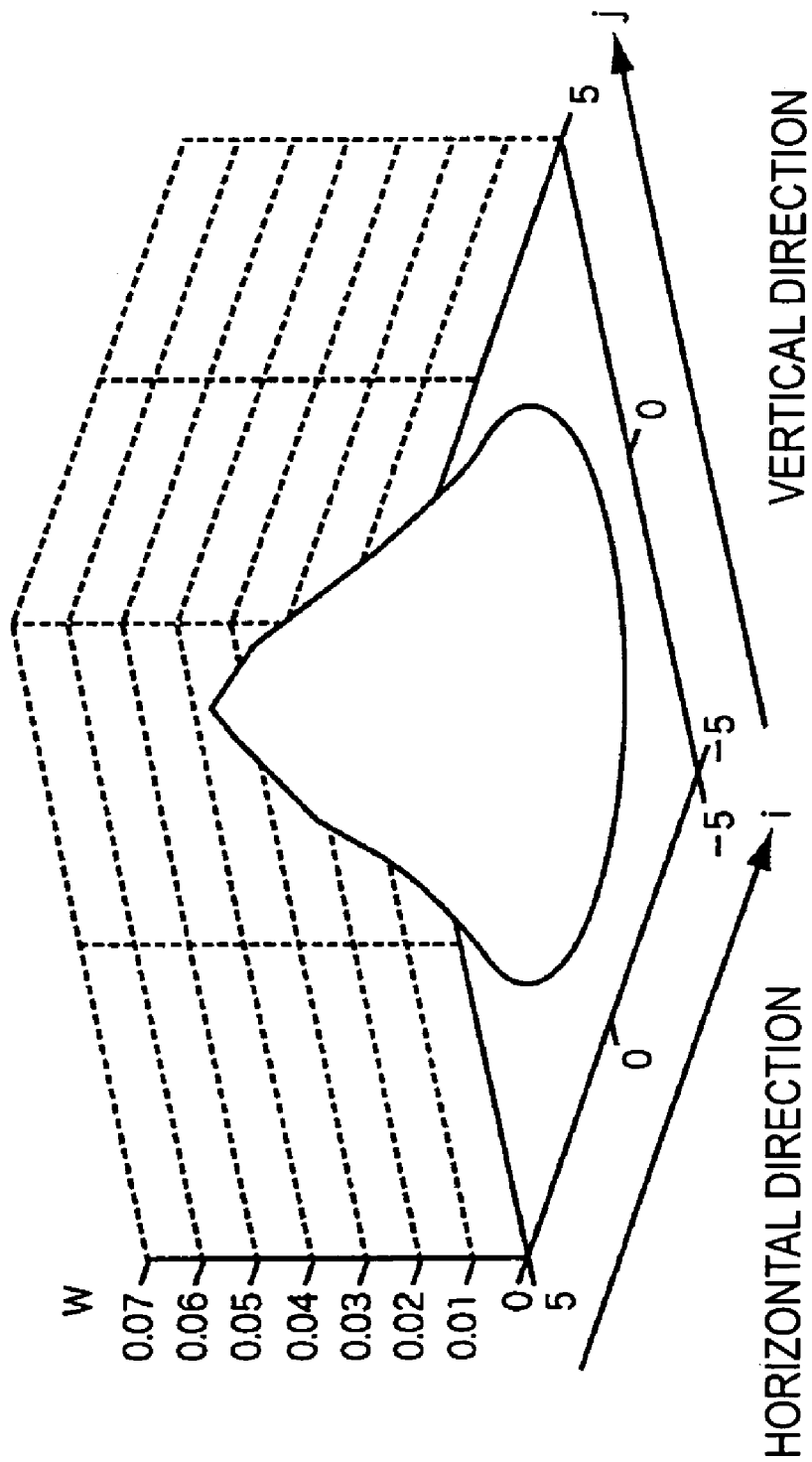
FIG. 3 is a diagram describing the blurring parameter σ.
Figure 4:
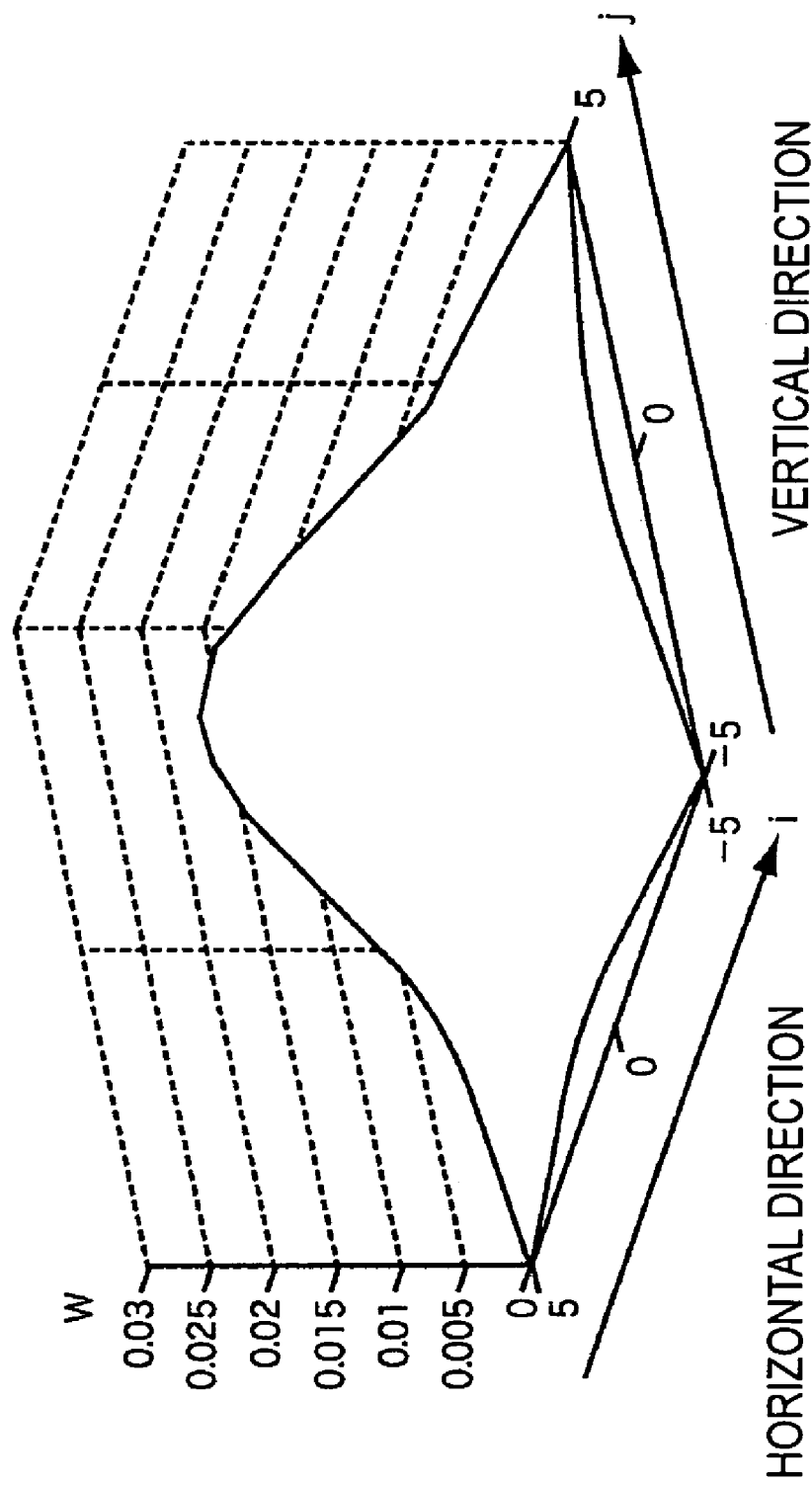
FIG. 4 is a diagram describing the blurring parameter σ.

The value of the weighted coefficient W(i, j) has a relatively radial characteristic when the value of the parameter σ is small, as illustrated in FIG. 3, and has a distribution spread smoothly over a wide range when the value of the parameter σ is large, as illustrated in FIG. 4.

Now, the positive directions in the horizontal plane of FIGS. 3 and 4 represent the pixel positions of the horizontal direction (i) and the vertical direction (j), respectively, and the vertical axis represents the value of the weighted coefficient W(i, j).

Figure 5:
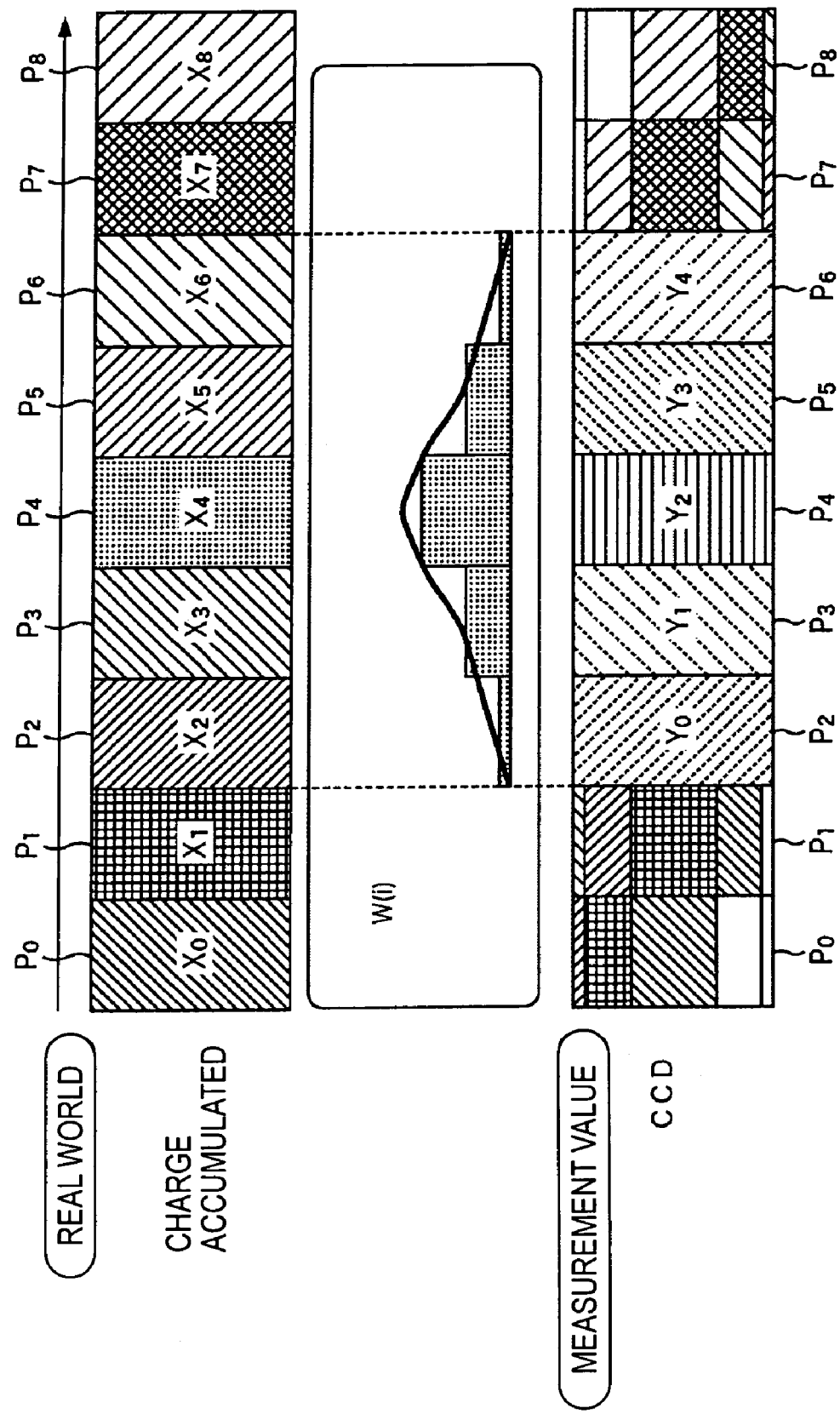
FIG. 5 is a diagram describing the principle of generation of focus blurring.

The description of the above relationship with regard to the output of each pixel of the CCD imaging device located on one axis in the horizontal direction is as illustrated in FIG. 5. Here, $P_0$ through $P_8$ illustrated on the lowest row in FIG. 5 represent the accumulation of potential in a blurred image taken by the CCD, each arrayed in a horizontal direction. With regard to $X_0$ through $X_8$ at the top row here, pixels $P_0$ through $P_8$ each represent the accumulation of potential in the case that an image without blurring is taken. The graph within FIG. 5 represents the characteristics of the weighted coefficient W(i). In this example, the variable i is −2>i>2, and the coefficient at the center is W(0), the coefficient to the left thereof is W(−1), and the coefficient to the further left thereof is W(−2). Similarly, the coefficient to the right of the center coefficient W(0) is W(1), and the coefficient to the further right thereof is W(2). The value of each coefficient W(i) is such that W(0) is the greatest, coefficients W(−1) and W(1) are smaller than this, and coefficients W(−2) and W(2) are a value even smaller.

Representing the observation value Y2 of the pixel $P_4$ based on the above described Equation (1) yields the following.

$$Y2 = W(-2)X2 + W(-1)X3 + W(0)X4 + W(1)X5 + W(2)X6 \quad (3)$$

Figure 6:
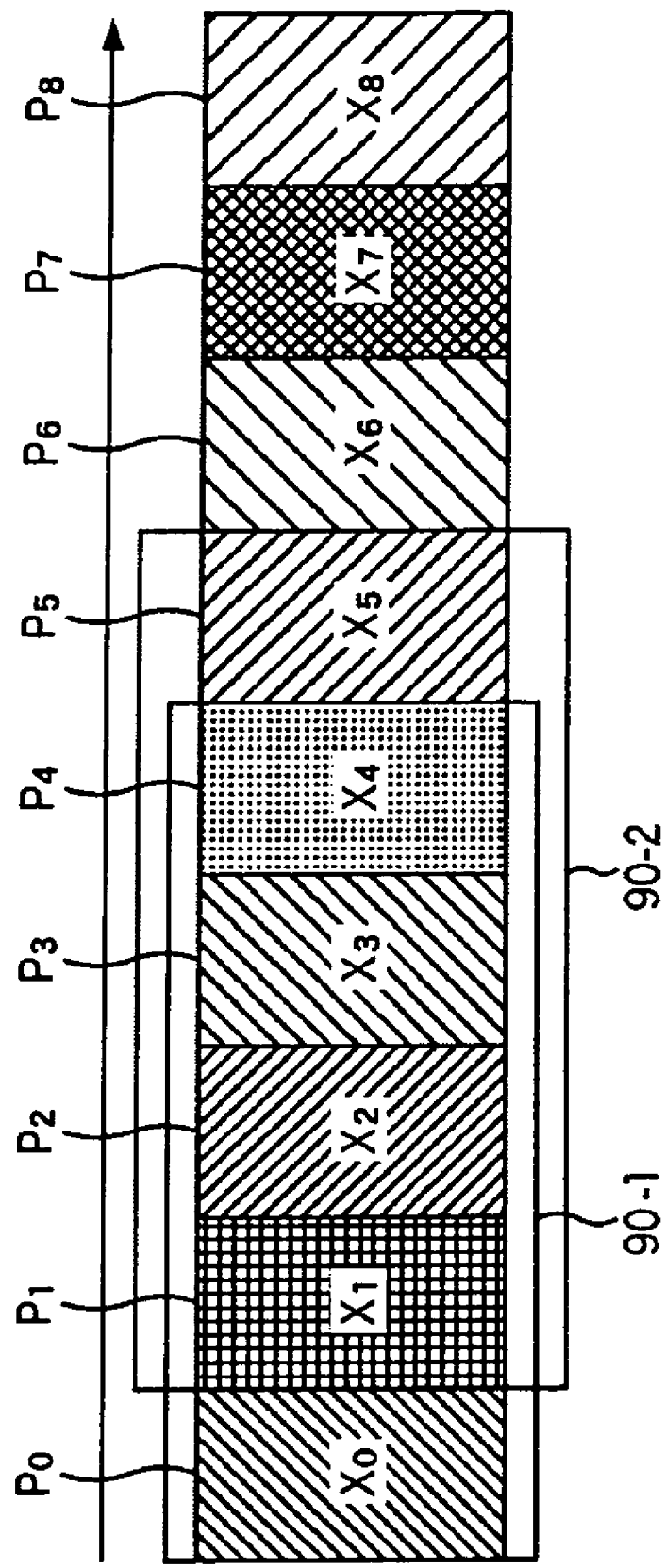
FIG. 6 is a diagram describing the range of the pixel values that influence the focus blurring.

Similarly, in the case of obtaining the observation value $Y_0$ of the pixel $P_2$ in FIG. 5, the observation value $Y_0$ can be obtained as follows by performing the calculation with the true value illustrated in frame 90-1 in FIG. 6 wherein the pixel $P_2$ is in the center.

$$Y0 = W(-2)X0 + W(-1)X1 + W(0)X2 + W(1)X3 + W(2)X4 \quad (4)$$

Similarly, in the case of obtaining the observation value $Y_1$ of the pixel $P_3$, the observation value $Y_1$ can be obtained as follows by performing the calculation with the true value illustrated in frame 90-2 in FIG. 6 wherein the pixel $P_3$ is in the center.

$$Y1 = W(-2)X1 + W(-1)X2 + W(0)X3 + W(1)X4 + W(2)X5 \quad (5)$$

Similar calculations can be performed also for the observation values Y3 and Y4.

Figure 7:
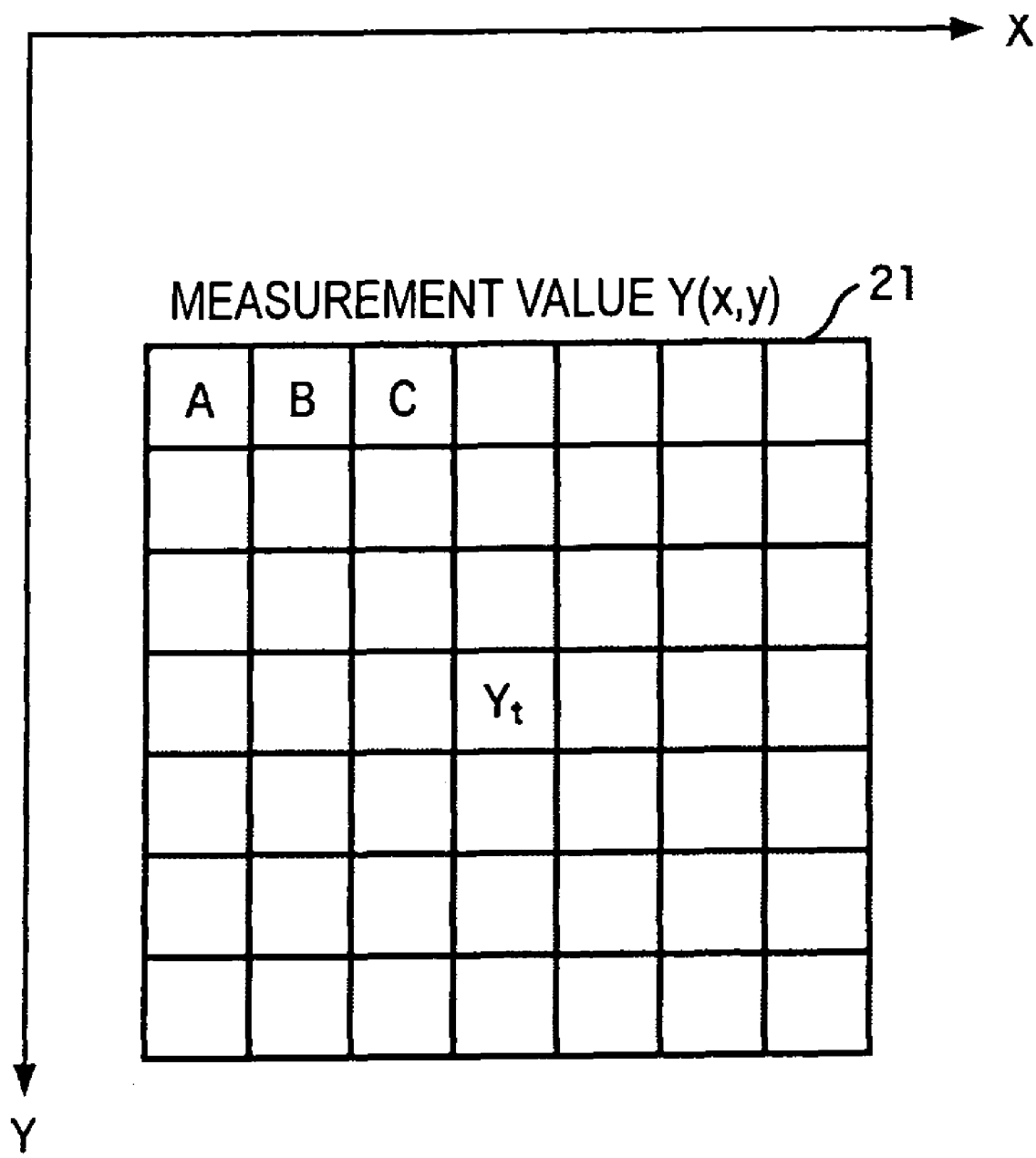
FIG. 7 is a diagram describing a two-dimensional pixel array.
Figure 8:
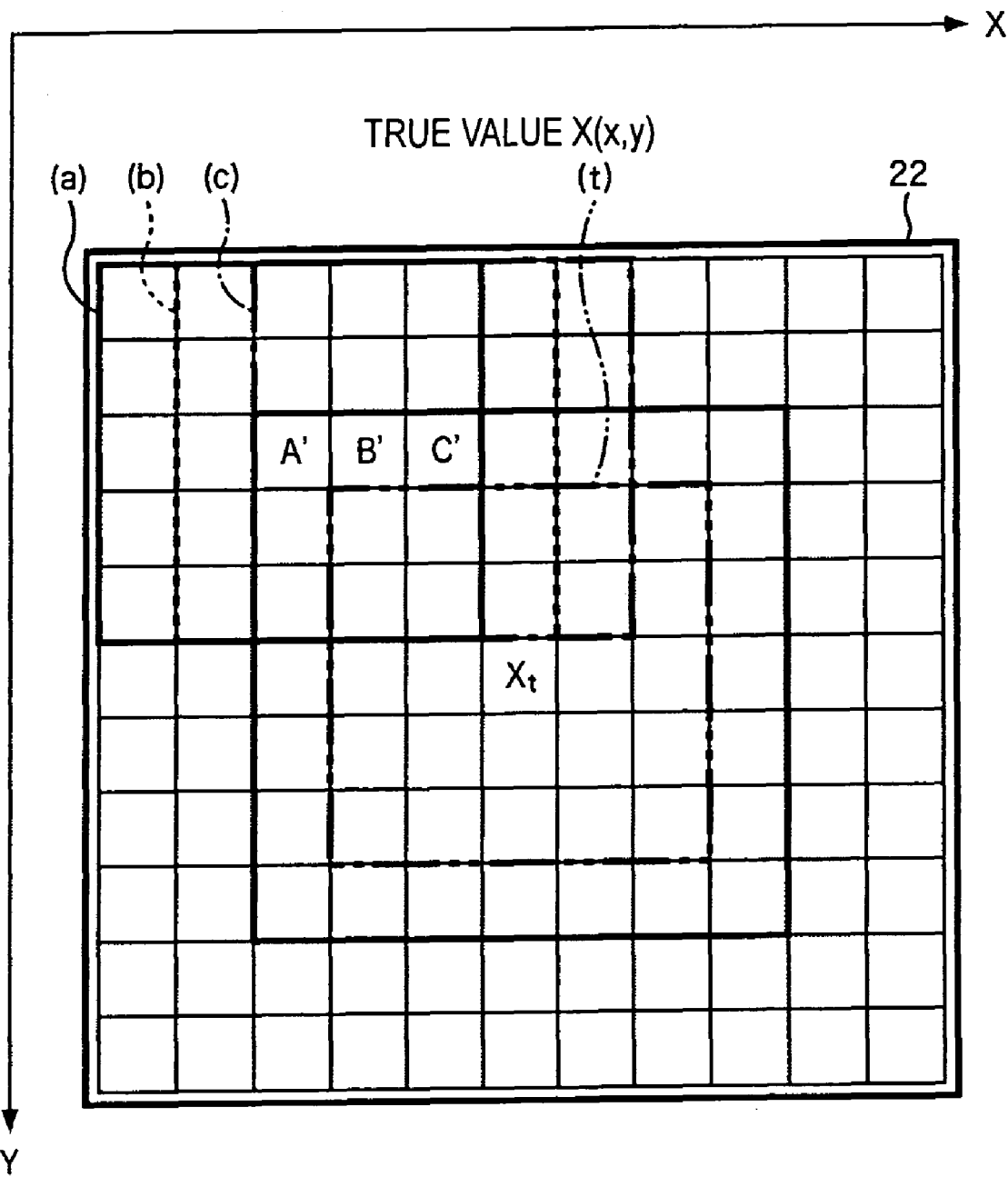
FIG. 8 is a diagram describing the pixels that influence the two-dimensional blurring.

Expanding the one-dimensional relationship illustrated in FIG. 5 so as to be two-dimensional, this can be illustrated as shown in FIGS. 7 and 8.

In other words, FIG. 7 represents the observation value Y (x, y) of the observation region of the 7×7 pixels wherein the observation value $Y_t$ is in the center. This observation value Y (x, y) is the value produced from the sum-of-products of the value of the true value X (x, y) illustrated in FIG. 8 with a weighted coefficient.

Specifically, the value of the pixel A in the upper left in FIG. 7 is represented in the following Equation, based on the true value corresponding to the twenty-five pixels illustrated in the frame (a) of the 5×5 pixels wherein the pixel A' that corresponds to the pixel A in FIG. 8 is in the center.

$$Y(x, y) = W(-2, -2)X(x-2, y-2) + \quad (6)$$
$$W(-1, -2)X(x-1, y-2) +$$
$$W(0, -2)X(x, y-2) \cdots +$$
$$W(2, 2)X(x+2, y+2)$$

$$W(j, i) = \frac{1}{2\pi\sigma^2} e^{\frac{j^2+i^2}{-2\sigma}} \quad (7)$$

Similarly, the observation value of the pixel B to the immediate right side of the pixel A in FIG. 7 is computed in the following Equation, based on the true value corresponding to the twenty-five pixels illustrated in the frame (b) wherein the pixel B' that corresponds to the pixel B in FIG. 8 is in the center.

$$Y(x+1, y) = W(-2, -2)X(x-1, y-2) + \quad (8)$$
$$W(-1, -2)X(x, y-2) +$$
$$W(0, -2)X(x+1, y-2) \cdots +$$
$$W(2, 2)X(x+3, y+2)$$

The pixel C on the further right side of the pixel B is computed as represented in the following Equation, based on the true value corresponding to the twenty-five pixels within the frame (c) wherein the pixel C' that corresponds to the pixel C in FIG. 8 is in the center.

Now, the $X_t$ of FIG. 8 is a true value that corresponds to the observation value $Y_t$ in FIG. 7, and the frame (t) is a frame of the 5×5 pixels wherein the true value $X_t$ is in the center.

$$Y(x+2, y) = W(-2,-2)X(x, y-2) + \quad (9)$$
$$W(-1,-2)X(x+1, y-2) +$$
$$W(0,-2)X(x+2, y-2) \cdots +$$
$$W(2, 2)X(x+4, y+2)$$

The weighted coefficient W(i, j) within Equations (8) and (9) are represented in Equation (7), similar to the case with Equation (6).

When the observation values corresponding to each pixel illustrated in FIG. 7 are computed as above, a determinant can be obtained such as that represented by the following Equation.

$$Y_f = \begin{pmatrix} Y(x, y) \\ Y(x+1, y) \\ Y(x+2, y) \\ Y(x+3, y) \\ \vdots \\ Y(x, y+1) \\ Y(x+1, y+1) \\ \vdots \\ Y(x+6, y+6) \end{pmatrix} \quad (10)$$

$$W_f = \begin{pmatrix} W(-2,-2) & W(-1,-2) & \cdots & W(2,2) \\ W(-2,-2) & W(-1,-2) & \cdots & W(2,2) \\ \vdots & \vdots & & \vdots \\ W(-2,-2) & W(-1,-2) & \cdots & W(2,2) \end{pmatrix} \quad (11)$$

$$X_f = \quad (12)$$
$$\begin{pmatrix} X(x-2, y-2) & X(x-1, y-2) & \cdots & X(x+4, y+4) \\ X(x-1, y-2) & X(x, y-2) & \cdots & X(x+5, y+4) \\ \vdots & \vdots & & \vdots \\ X(x+2, y+2) & X(x+3, y+2) & \cdots & X(x+8, y+8) \end{pmatrix}$$

$$Y_f = W_f X_f \quad (13)$$

From the determinants represented by the Equation (10) through Equation (13), the true value X (x, y) can be estimated if the inverse matrix of $W_f$ can be computed.

However, as can be understood by observing the difference between the observation region 21 in FIG. 7 and the corresponding area (pixel count) of the mixed region 22 in FIG. 8, the true value X (x, y) cannot be solved with only the above-described Equation (10) through Equation (13), because the number of the true value X (x, y) to be estimated is greater than the observation value Y (x, y).

Therefore, with the present invention, the following Equation (14) through Equation (17) are introduced as relational Equations, in addition to the Equation (10) through Equation (13). Each of these are conditional in that the value of the difference of the pixels adjacent on the upper, right, lower, or left side multiplied by the coefficient $W_a$ becomes 0.

$$W_a(X(x,y)-X(x,y-1))=0 \quad (14)$$

$$W_a(X(x,y)-X(x+1,y))=0 \quad (15)$$

$$W_a(X(x,y)-X(x,y+1))=0 \quad (16)$$

$$W_a(X(x,y)-X(x-1,y))=0 \quad (17)$$

Therefore, as a general characteristic of an image, the correlation is high between the adjacent pixels, and therefore, if the coefficient $W_a$ in the above-described Equation (14) through Equation (17) is set to be an extremely small value, the contradiction is not very great. Further, based on the activity estimated from the input image, the coefficient $W_a$ in the above-described Equation (14) through Equation (17) can also be switched for every pixel. Thus, in addition to Equation (10) through Equation (13), by adding the ancillary relational Equations of Equation (14) through Equation (17) to the entire region of the 11×11 true value X (x, y) illustrated in FIG. 8, or to one portion within the region, the numeral of the true value X (x, y) is equal to or less than the numeral of the Equation, and the true value X (x, y) can be computed based on the following Equation.

$$Y_s = W_s X_s \quad (18)$$

$$X_s = W_s^{-1} Y_s \quad (19)$$

Further, as illustrated in FIG. 9, based on the direction that the edge exists, one of the Equation (14) through Equation (17) can be selected to be applied.

Therefore, the pixel $P_{0a}$ does not cross over the edge 25A to any of the pixels adjacent to the upper, lower, left, or right. Thus, in this case, all of the conditions of Equation (14) through Equation (17) can be applied. In contrast, the pixel $P_{0b}$ does not have an edge 25A between the pixels adjacent to the upper, lower, or right side, but an edge 25A does exist between the pixel adjacent to the left side. Thus, in this case, only the conditions of Equation (14) through Equation (16) are applied, and only the condition of Equation (17) that corresponds to the difference between the pixel adjacent to the left side is not applied. Thus, correction with greater precision is possible.

Similarly, the pixel $P_{0c}$ does not have an edge between the pixels adjacent to the lower side or the right side, but an edge 25A does exist between the pixel adjacent to the upper side and the left side. Thus, in this case, the conditions of Equation (15) and Equation (16) that correspond to the difference between the pixels adjacent to the right side or the lower side are applied, and the conditions of Equation (14) and Equation (17) that correspond to the difference between the pixel adjacent to the upper side and left side are not applied.

Now, not applying as a condition means that the value of the coefficient $W_a$ in Equation (14) through Equation (17) is set to be 0. Instead of setting the value of the coefficient $W_a$ to be 0, the value of the coefficient $W_a$ in the direction that the edge exists can be set to be a value smaller than the value of the coefficient $W_a$ in the direction that the edge does not exist.

Figure 9A:
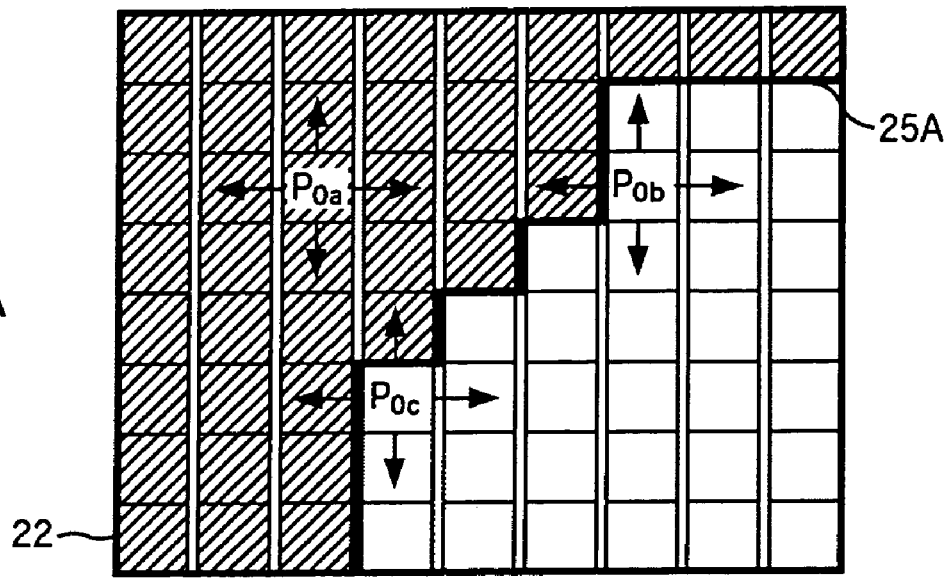
FIGS. 9A and 9B are diagrams describing the edges that influence the focus blurring.
Figure 9B:
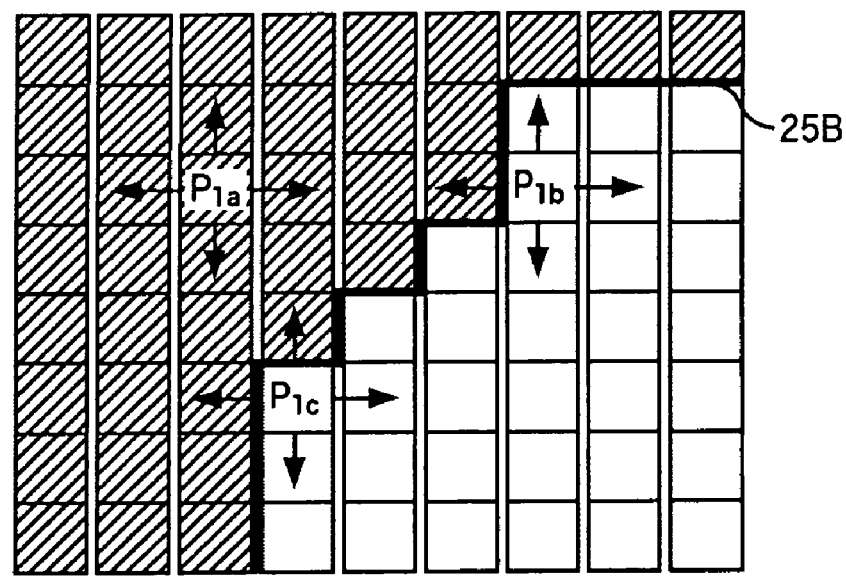

Now, in this case also, the premise is the value of difference as to the adjacent pixels to the upper, lower, left, and right sides of the pixels $P_{0a}$, $P_{0b}$, and $P_{0c}$ of the observation value illustrated in FIG. 9A being approximately equal to the difference as to the adjacent pixels to the upper, lower, left, and right sides of the pixels $P_{1a}$, $P_{1b}$, and $P_{1c}$ of the corresponding true value illustrated in FIG. 9B.

FIG. 10 represents a more detailed configuration example of the image correction processing device 11. This image correction processing device 11 comprises a user interface unit 31, a parameter correction unit 32, and a blurring correction unit 33.

Figure 11:
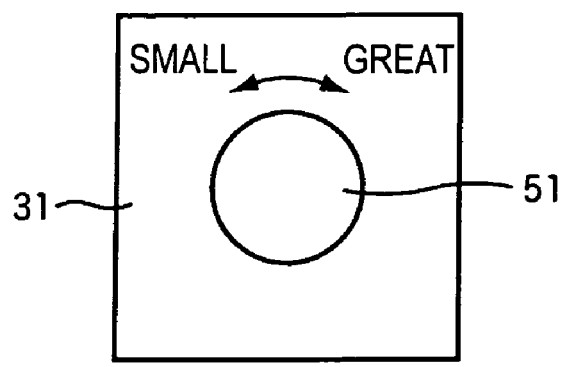
FIG. 11 is a diagram illustrating a configuration example of the user interface unit of FIG. 10.

As illustrated in FIG. 11, the user interface unit 31 has a knob 51, and by rotating this in a counter-clockwise direction, the value of the parameter σ can be decreased, and by rotating this in a clockwise direction, the value of the parameter σ can be increased. The parameter σ that is specified by the user interface unit 31 is supplied to the parameter correction unit 32. The parameter correction unit 32 corrects the value of the parameter a provided by the user interface unit 31, based on the feature quantity of the input image data, and supplies the corrected parameter σ to the blurring correction unit 33. The blurring correction unit 33 performs processing to correct the blurring of the image of the input image data, based on the corrected parameter σ, and outputs this image data.

The processing of the image correction processing device 11 in FIG. 10 (corresponding to the image correction process of step S1 in FIG. 2), and is such as illustrated in the flowchart in FIG. 12.

Therefore, upon the user operating the user interface unit 31 and specifying the predetermined parameter σ, the parameter correction unit 32 executes the parameter correction processing in step S31. The details thereof will be described below, but due to this the parameter σ is corrected based on the feature quantity of the image data, and the corrected parameter σ is generated.

In step S32, the blurring correction unit 33 executes the blurring correction processing. The details thereof will be described below while referencing the flowchart in FIGS. 23 and 24, and due to this processing, the blurring of the image of the input image data is corrected, the image data of the image wherein the blurring has been corrected is output, and is provided to the display device 12, and displayed as an image.

Then, in the case that the user determines after viewing the image that further correcting is necessary, the user specifies a new parameter σ by operating the user interface unit 31 again. By repeating such processing, the image data of an image wherein the blurring is corrected can be obtained.

FIG. 13 represents a detailed configuration example of the parameter correction unit 32. The parameter correction unit 32 comprises a selecting unit 63 that selects one smallest estimated parameter as the correction parameter, from the four estimated parameters that are output from the look-up tables 62-1 through 62-4 and the look-up tables (LUT) 62-1 through 62-4 that estimate the estimated parameter, based on the value of the parameter σ that is supplied from the user interface unit 31, the feature quantity detecting units 61-1 through 61-4 that detect the differing feature quantities from the input image data, and the feature quantity that is output by the feature quantity detecting units 61-1 through 61-4.

The feature quantity detecting unit 61-1 comprises a feature quantity extracting unit 71-1 and a maximal value search unit 72-1. The feature quantity extracting unit 71-1 extracts the feature quantity of the pixels in the observation region wherein the input image data is set based on the value of the parameter σ supplied by the user interface unit 31. In the case that the number of pixels in the range of the observation region is N, then N feature quantities are extracted. The maximal value search unit 72-1 searches the maximal value from the N feature quantities that are supplied by the feature quantity extracting unit 71-1, and outputs to the look-up table 62-1.

Similar to the feature quantity detecting unit 61-1, the feature quantity detecting units 61-2 through 61-4 also have the feature quantity extracting units 71-2 through 71-4 and the maximal value search units 72-2 through 72-4. The basic operation thereof is similar to the case with the feature quantity detecting unit 61-1.

The feature quantities that the feature quantity extracting units 71-1 through 71-4 each extract are each feature quantities of an activity system, and are feature quantities that have a certain correlation with the parameter σ that corresponds to the blurring amount. In other words, if the parameter σ is large, the feature quantity will be either smaller or greater. Specifically, the primary differential value, the secondary differential value, the dynamic range of N pixels, and the dispersion of N pixels and so forth are extracted.

With a pixel of interest as B, the pixel adjacent thereto at the left as A, and the pixel adjacent thereto at the right as C, the greater of the absolute value of difference between the pixel of interest B and the pixel A adjacent to the left |B−A| and the absolute value of difference between the pixel of interest B and the pixel C adjacent to the right |B−C| can be taken as the primary integration value. Also, the absolute value of difference between the value of the pixel of interest B doubled (2B) and the sum of the left and right pixels (A+C), i.e., the absolute value |2B−(A+C)| can be taken as the secondary integration value. Also, the dynamic range of N pixels is the difference of the maximal value MAX and the minimal value MIN of N pixels, represented by DR=MAX−MIN. Also, instead of dispersion of N pixels (a value obtained by dividing the sum of the square of the difference between the average value of N pixels and each of the N pixels, divided by N), other values may be used, such as the sum of the square of the difference between the average value of N pixels and each of the N pixels, the sum of absolute values of the difference between the average value of N pixels and each of the N pixels, a value obtained by dividing the sum of the absolute values with N, and so forth.

Next, the parameter correction processing will be described referencing the flowchart in FIG. 14. This processing is performed as the processing for step S31 in FIG. 12.

In step S51, the user interface unit 31 acquires a parameter. In other words, the value of the parameter σ that is input by the user operating the knob 51 is acquired. The acquired parameter σ is supplied to the feature quantity extracting units 71-1 through 71-4 and the look-up tables 62-1 through 62-4.

Figure 15:
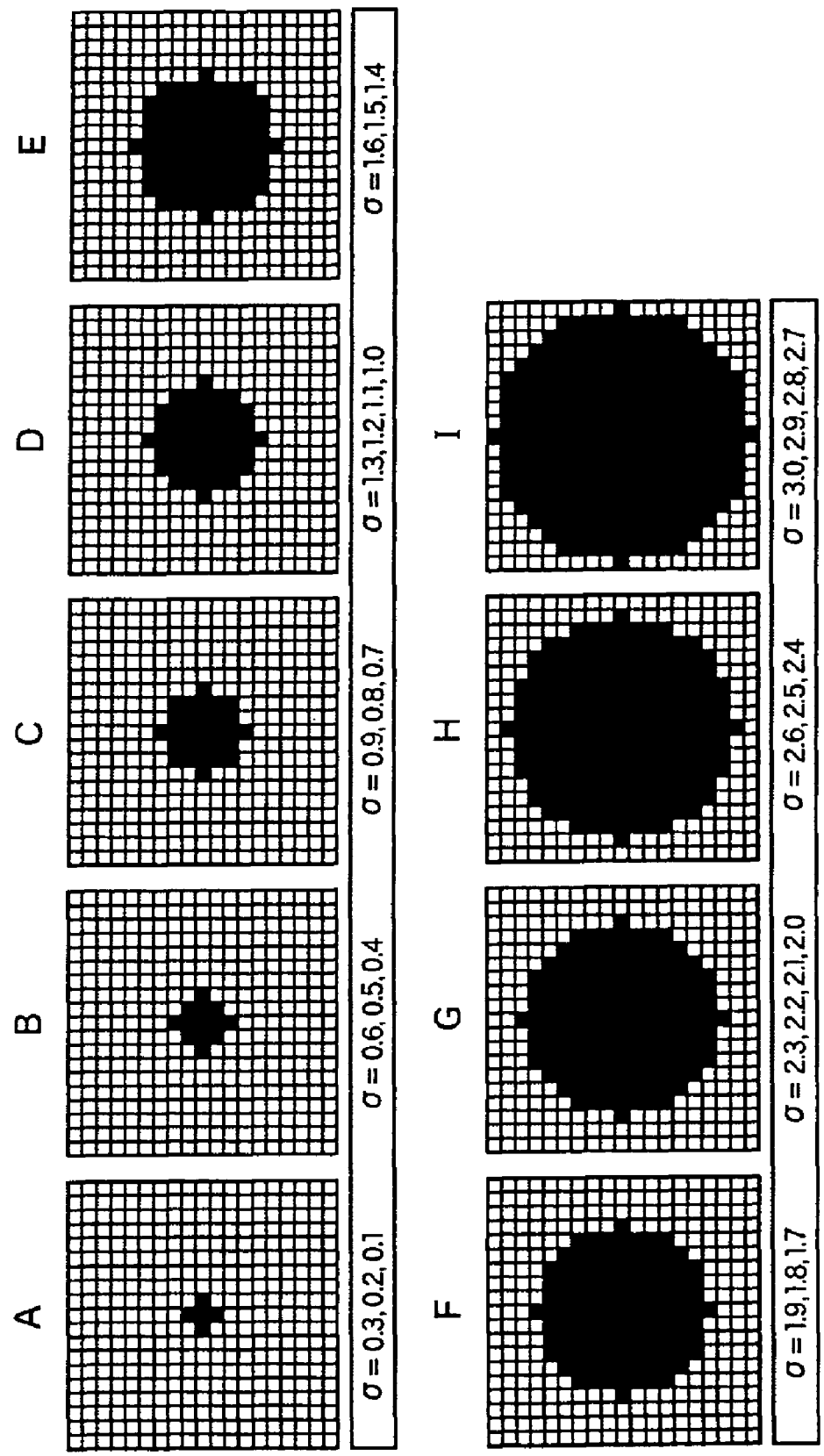
FIG. 15 is a diagram describing the observation region.

In step S52, the feature quantity extracting units 71-1 through 71-4 set the observation region. In other words, the feature quantity extracting units 71-1 through 71-4 first set the region that corresponds to the parameter σ that is acquired in the processing of step S51 as the observation region. Specifically, as illustrated in FIG. 15, a region that includes three times as many pixels as the value of the parameter σ from the pixels of interest is set as the observation region. FIG. 15A represents the observation region in the case that the value of 3σ is 1. However, the value of 3σ is a value that has been rounded. Therefore, in each of the cases wherein the value of σ is 0.1, 0.2, or 0.3, the value of 3σ is 1. FIG. 15B represents the observation region in the case that the value of 3σ is 2. The value of σ in this case is 0.4, 0.5, or 0.6.

Hereafter, similarly, FIGS. 15C through 15I represent the observation region in the case wherein the value of 3σ is each 3 through 9, respectively. The value of σ shown on the bottom of the diagram represents the observation region corresponding to the case that each value is trebled and rounded. In the case of this example, as illustrated in FIG. 15, the observation region is a region with an approximate circle shape wherein the pixels of interest are in the center thereof. Thus, by setting the size of the observation region to increase as the value of the parameter σ increases, the feature quantity of the pixels that are not influencing the blurring is detected, and erroneous processing can be prevented.

Next, in step S53, the feature quantity extracting units 71-1 through 71-4 extract the feature quantities. As described above, the feature quantity extracting units 71-1 through 71-4 each extract a feature quantity that is allocated to itself and that differs from the others. For example, the feature quantity extracting unit 71-1 extracts the primary differential value as the feature quantity, and the feature quantity extracting unit 71-2 extracts the secondary differential value as the feature quantity, and the feature quantity extracting unit 71-3 extracts the dynamic range as the feature quantity, and the feature quantity extracting unit 71-4 extracts the dispersion as the feature quantity. Thus, by detecting multiple feature quantities, omissions in blurring parameter correction that should be performed can be avoided.

In step S54, the maximal value search units 72-1 through 72-4 search for the maximal value (the feature quantity wherein the blurring is least). In other words, the maximal value search unit 72-1 searches for the maximal value of the primary differential value of the pixels within the observation region that the feature quantity extracting unit 71-1 has extracted. The maximal value search unit 72-2 searches for the maximal value of the secondary differential value of the pixels within the observation region that the feature quantity extracting unit 71-2 has extracted. The maximal value search unit 72-3 searches for the maximal value of the dynamic range of the pixels within the observation region that the feature quantity extracting unit 71-3 has extracted. The maximal value search unit 72-4 searches for the maximal value of the dispersion of the pixels within the observation region that the feature quantity extracting unit 71-4 has extracted. Now, in the case of dispersion, only one value exists, and therefore that value is searched for as the maximal value.

In step S55, the look-up tables 62-1 through 62-4 estimate the estimated parameters while referencing the statistical data. The details thereof will be described below referencing FIGS. 16 through 21. The value of the parameter $\sigma$ that is specified by the user and supplied by the user interface unit 31 is converted to the estimated parameter. In the case that the maximal value of the feature quantity corresponding to the value of the parameter $\sigma$ specified by the user is smaller than the maximal value searched out by the maximal value search units 72-1 through 72-4, this estimated parameter changes to a parameter value that corresponds to the maximal value of a value greater than the maximal value searched out by the maximal value search units 72-1 through 72-4. Thus, overshooting and ringing occurring in images that are not blurred, and deterioration in images can be suppressed.

In step S56, the selecting unit 63 executes the processing to select the smallest estimated parameter from the estimated parameters output by the look-up tables 62-1 through 62-4. In other words, the sizes of the four estimated parameters output by the look-up tables 62-1 through 62-4 are compared, and the one smallest estimated parameter (the parameter with the least amount of blurring) is selected and is output as the correction parameter. Thus, the parameter $\sigma$ that is selected by the user is converted (corrected) to the correction parameter.

The correction parameter that is generated in this manner is set as a value that is capable of suppressing image deterioration at the portion of the image that is not out of focus, such as overshooting or ringing due to the out-of-focus correction processing.

FIG. 16 represents an example of the look-up tables 62-1 through 62-4. These all have similar configurations. For example, with FIG. 16 as the look-up table 62-1, as illustrated in the same diagram, the look-up table 62-1 is a table wherein the value of the parameter $\sigma$ specified by the user interface unit 31 is the address of one axis (the vertical axis in FIG. 16), the maximal value of the feature quantity output by the maximal value search unit 72-1 is the address of the other axis (the horizontal axis in FIG. 16), and the estimated parameter stored in the region specified by the vertical axis and the horizontal axis is output. In FIG. 16, the parameter $\sigma$ of the vertical axis increases in order from the bottom to the top, and the feature quantity V on the horizontal axis increases from the left to the right.

The value of the estimated parameter stored in the frame (representing the storage region) in FIG. 16 basically is the value of the parameter $\sigma$ specified by the user, as illustrated in the region not shaded in FIG. 16. For example, in the frame wherein the value of the parameter $\sigma$ as the vertical axis address is $\sigma_{60}$, in the region not shaded (the region in the case that the value of the feature quantity V serving as the address is relatively small), the value $\sigma_{60}$ that is the same as the value $\sigma_{60}$ serving as the address is stored as the estimated parameter, regardless of the value of the feature quantity V, and in the frame wherein the value of the parameter $\sigma$ serving as the address is $\sigma_{80}$, $\sigma_{80}$ is stored as the estimated parameter in the region not shaded, regardless of the value of the feature quantity V.

However, in the shaded regions in the diagram (the region in the case that the value of the feature quantity V serving as the address is large), any one of the values $\sigma_{70}$, $\sigma_{50}$, or $\sigma_{30}$ that is smaller than the parameter $\sigma$ specified by the user is stored. In other words, in the case that the maximal feature quantity detected is smaller than the maximal value of the feature quantity corresponding to the parameter $\sigma$ specified by the user, the value of the specified parameter $\sigma$ is used without change, but in the case that the detected maximal feature quantity is greater than the maximal value of the feature quantity corresponding to the specified parameter $\sigma$, the parameter corresponding as the maximal value of the feature quantity wherein the feature quantity that has a value greater than the detected feature quantity is stored as the estimated parameter.

Figure 17:
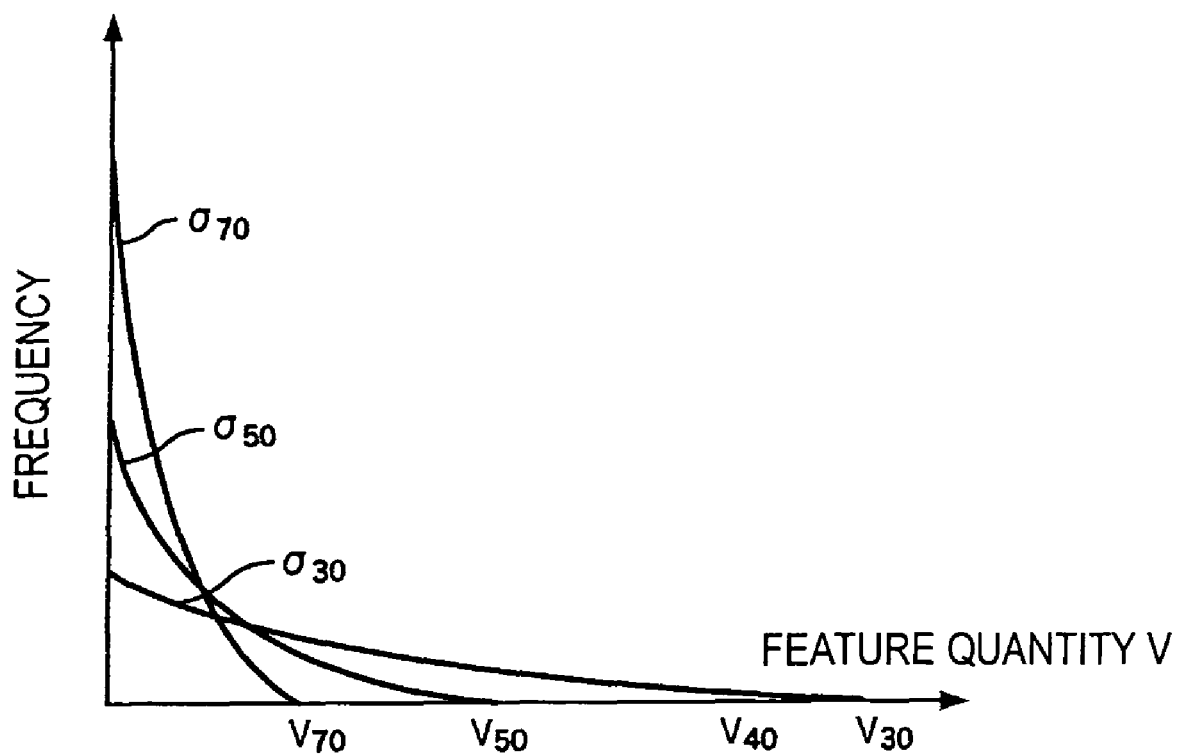
FIG. 17 is a diagram describing the relationship between the feature quantity, the frequency, and the parameter σ.

This principle (rule) is further described as follows, referencing FIG. 17. As illustrated in FIG. 17, the parameter $\sigma$ and the feature quantity V are generally confirmed through experimentation to have the relationship wherein the value of the acquired feature quantity V decreases as the value of the parameter $\sigma$ increases. In other words, detecting the feature quantity V of the image in the case that the value of the parameter $\sigma$ is set to a certain value and plotting this number (frequency) on a graph results in that illustrated in FIG. 17, where pixels that have a small value of the feature quantity V are great in number, and the number of pixels with a large feature quantity V gradually decreases, and the pixels that have a feature quantity V greater than the certain value (maximal value) become almost nonexistent. In other words, when the parameter $\sigma$ of the image is determined, the maximal value of the feature quantity of the image is determined. Further, the range of distribution of the feature quantity V becomes narrower as the value of the parameter $\sigma$ increases, and the maximal value of frequency increases as the value of the parameter $\sigma$ increases (the feature quantity V and the frequency have the characteristics of increasing sharply as the value of the parameter $\sigma$ increases, and the maximal value of the frequency also increases, and slopes more gently as the value of the parameter $\sigma$ decreases, and the maximal value of the frequency also decreases).

For example, let us say that in the case that the value of the parameter $\sigma$ is $\sigma_{70}$, the maximal value of the feature quantity V that can be acquired of that image is $V_{70}$. Similarly, let us say that the maximal value of the feature quantity is $V_{30}$ in the case that the value of the parameter $\sigma$ is $\sigma_{30}$ and the maximal value of the feature quantity is $V_{50}$ in the case that the value of the parameter $\sigma$ is $\sigma_{50}$. In this case, if the value $\sigma_{70}$ of the parameter $\sigma$ is greatest, and the value $\sigma_{50}$ is the next greatest, the value $\sigma_{30}$ is the smallest, the value of the maximal value $V_{30}$ becomes the greatest, and value $V_{50}$ is the next greatest, and maximal value $V_{70}$ becomes the smallest.

In the case that the value of the parameter σ specified by the user is $\sigma_{70}$, in the case that the maximal value of the feature quantity of the image to be processed is smaller than the value $V_{70}$ (the maximal value of the feature quantity V in the case that the parameter σ is $\sigma_{70}$), such a feature quantity normally exists, and therefore even if the blurring correction processing is performed, overshooting or ringing will not occur. Conversely, if the maximal value V of the feature quantity of that image is greater than the value $V_{70}$, the feature quantity V of the image of the specified parameter $\sigma_{70}$ results in a value that would not normally exist, and therefore if the out-of-focus correction processing is performed, overshooting or ringing can occur. Therefore, in order to prevent this, in such cases, the value $\sigma_{70}$ of the specified parameter σ is forcibly changed to the smaller value of $\sigma_{50}$.

Further, in the case that the maximal value of the feature quantity of the image to be processed is greater than $V_{50}$, even if the value of the parameter σ is changed to $\sigma_{50}$, overshooting or ringing can occur because a feature quantity exists that is greater than the corresponding maximal value $V_{50}$. Therefore, in this case, the value of the parameter σ is changed to the smaller value of $\sigma_{30}$. Therefore, as illustrated in FIG. 16 in the frame wherein the value of the vertical axis parameter σ is $\sigma_{70}$, as far as the region corresponding to the value $V_{70}$ for the value of the feature quantity V serving as the address, the value of the estimated parameter is the value $\sigma_{70}$ that is the same as the value specified by the user, but in the shaded region on the lower right side of the diagram where the value of the feature quantity V is in the region between the values $V_{70}$ and $V_{50}$, the estimated parameter value becomes $\sigma_{50}$. Then further, in the shaded region in the vertical direction of the diagram where the value of the feature quantity V serving as the address is in the region between the values $V_{50}$ and $V_{30}$, the estimated parameter value becomes $\sigma_{30}$.

Similarly, for example, in the case that the value of the maximal value of the feature quantity V to be acquired is value $V_{90}$, wherein the case that the value of the user specified parameter σ is $\sigma_{90}$, in the non-shaded areas of the diagrams wherein the value of the feature quantity V serving as the address is up to value $V_{90}$, the estimated parameter value becomes the same value $\sigma_{90}$ as the value of the user specified parameter σ. Further, in the shaded region in the lower left of the diagram that is the region wherein the feature quantity V value is from $V_{90}$ through $V_{70}$, the estimated parameter value becomes $\sigma_{70}$. In the shaded region in the lower right wherein the value of the feature quantity V is from $V_{70}$ through $V_{50}$, the estimated parameter value becomes $\sigma_{50}$, and in the shaded region in the vertical direction wherein the value of the feature quantity V is from value $V_{50}$ through $V_{30}$, the estimated parameter becomes $\sigma_{30}$.

In the example of FIG. 16, the estimated parameter value in the region wherein overshooting or ringing was feared, was set as any one of the three $\sigma_{70}$, $\sigma_{50}$, or $\sigma_{30}$, but even a greater number of estimated parameters may be provided beforehand.

With the embodiment in FIG. 16, $\sigma_{30}$ is set to be the lowest value of the parameter σ that can be specified by the user. Therefore, an estimated parameter in the case that an even small parameter σ is set is not needed, and therefore is not stored.

The feature quantity $V_{80}$ in FIG. 16 represents the greatest possible existing value of a feature quantity in the case that the value of the user specified parameter σ is $\sigma_{80}$, and in the case that the user specified parameter σ is $\sigma_{60}$, the feature quantity $V_{60}$ represents the maximal value of the feature quantity V of the image to be acquired, and the feature quantity $V_{40}$ represents the maximal value of the feature quantity V in the case that the user specified parameter σ is $\sigma_{40}$.

Now, the relation is $V_{90} < V_{80} < V_{70} < V_{60} < V_{50} < V_{40} < V_{30}$.

Figure 18:
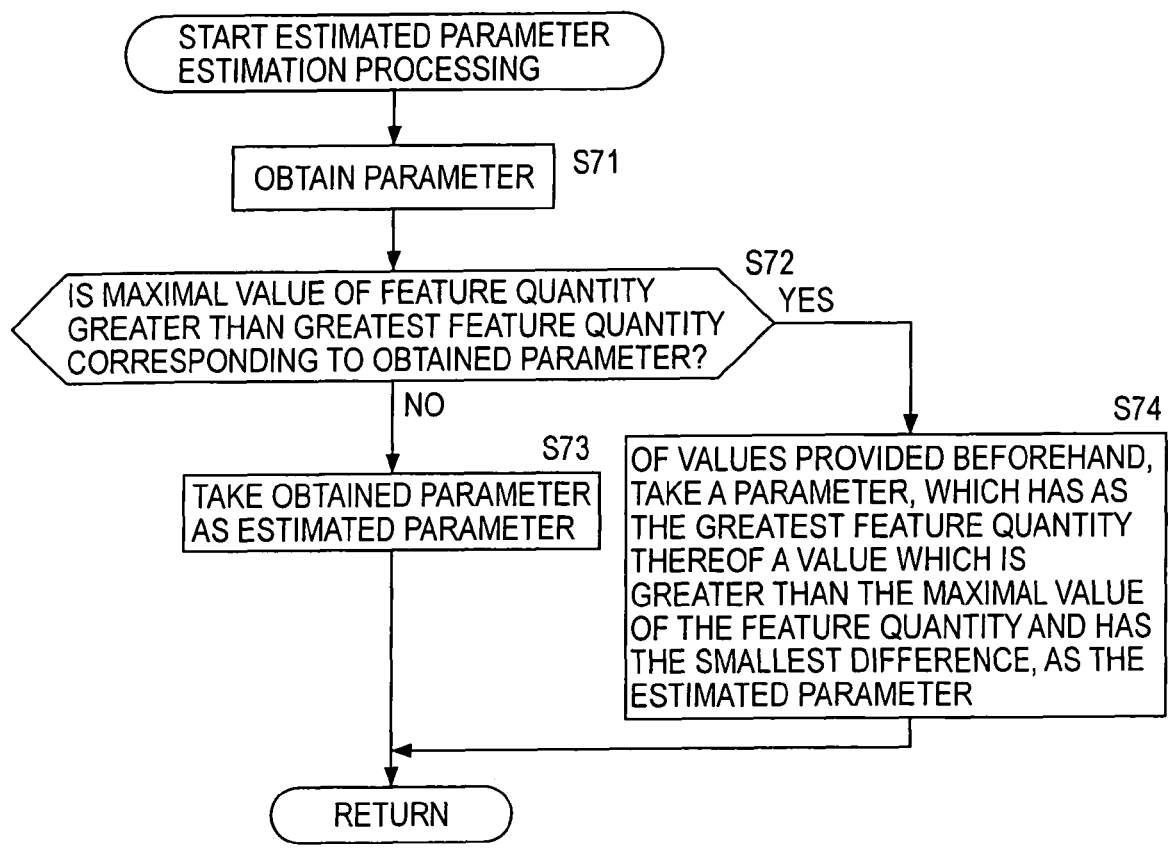
FIG. 18 is a flowchart describing the estimated parameter estimating processing.

In other words, referencing the statistical data in step S55 of the look-up tables 62-1 through 62-4 the processing to estimate the estimated parameter essentially executes the processing illustrated in the flowchart in FIG. 18.

That is to say, in step S71, the look-up tables 62-1 through 62-4 acquire a parameter σ that is input by the user interface unit 31. In step S72, the look-up tables 62-1 through 62-4 determine whether the maximal value of the feature quantity provided by the maximal value search units 72-1 through 72-4 is greater than the maximal feature quantity corresponding to the acquired parameter, and in the case that it is greater, the parameter value of the maximal feature quantity with a value greater than the maximal value of the feature quantities of the previously arranged values and with the smallest difference is set as the estimated parameter in step S74.

For example, as illustrated in FIG. 19, in the case that the specified parameter σ is value $\sigma_{90}$, in the case wherein the maximal value $V_{80}$ of the feature quantity of the image to be processed is greater than the value $V_{90}$, of the previously prepared values $V_{70}$, $V_{50}$, and $V_{30}$, the parameter value $\sigma_{70}$ that has a value larger than the maximal value $V_{80}$ and has the smallest difference value $V_{70}$ as the maximal feature quantity is set as the estimated parameter.

Further for example, as illustrated in FIG. 20, in the case that the specified parameter σ is value $\sigma_{70}$, in the case wherein the maximal value $V_{60}$ of the feature quantity of the image to be processed is greater than the value $V_{70}$, of the previously prepared values $V_{70}$, $V_{50}$, and $V_{30}$, the parameter value $\sigma_{50}$ that has a value larger than the maximal value $V_{60}$ and has the smallest difference value $V_{50}$ as the maximal feature quantity is set as the estimated parameter.

Figure 21:
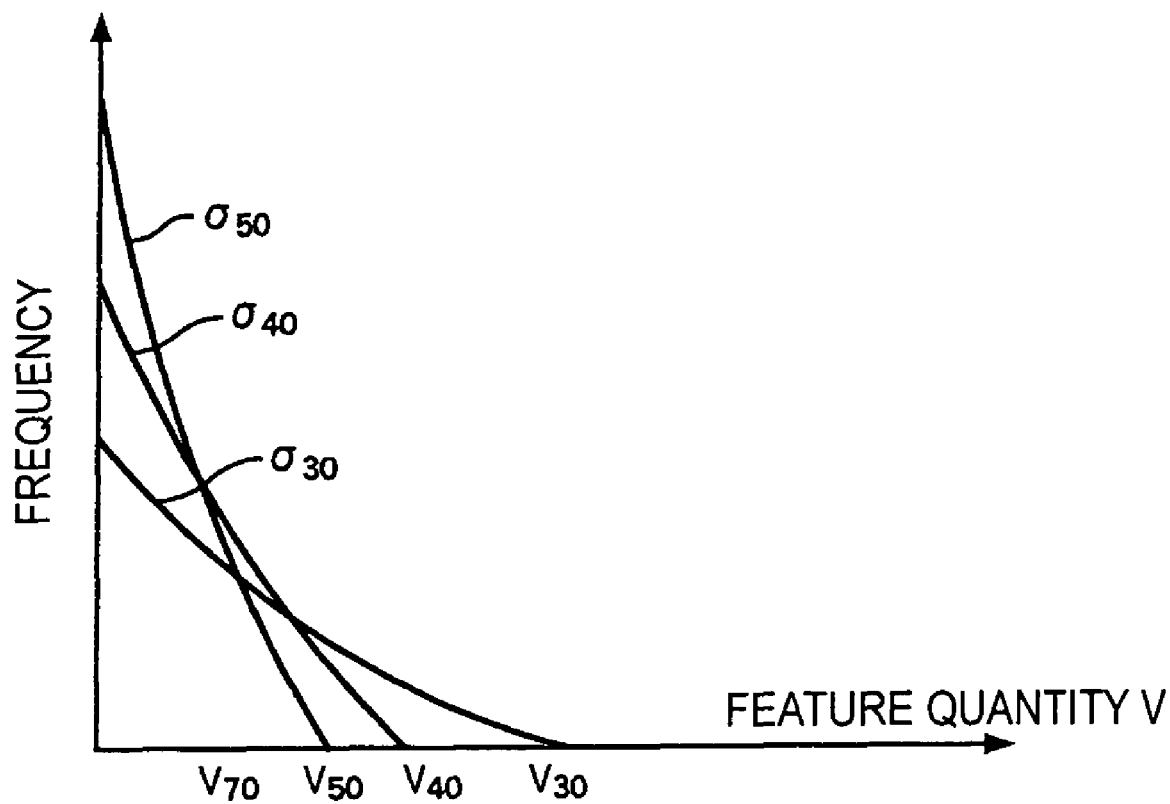
FIG. 21 is a diagram describing the relationship between the feature quantity, the frequency, and the parameter σ.

Similarly, as illustrated in FIG. 21, in the case that the specified parameter σ is value $\sigma_{50}$, in the case wherein the maximal value $V_{40}$ of the feature quantity of the image to be processed is greater than the value $V_{50}$, of the previously prepared values $V_{70}$, $V_{50}$, and $V_{30}$, the parameter value $\sigma_{30}$ that has a value larger than the maximal value $V_{40}$ and has the smallest difference value $V_{30}$ as the maximal feature quantity is set as the estimated parameter.

Conversely, in step S72, in the case that the maximal value of the feature quantity is determined to be equal to or smaller than the maximal feature quantity corresponding to the acquired parameter, the look-up tables 62-1 through 62-4 change the acquired parameter into the estimated parameter in step S73. In other words, in this case, the parameter acquired in step S71 becomes the estimated parameter without change.

Thus, even if the value of the user specified parameter σ is used for the blurring correction, it is changed into an estimated parameter wherein overshooting or ringing will not occur. Thus, the occurrence of overshooting and ringing is prevented.

Now, the values of the frequency, feature quantity, and parameter σ in FIGS. 17, 19, 20, and 21 are illustrated to show the correlation thereof within each of the diagrams, and the correlation between diagrams is ignored.

Figure 22:
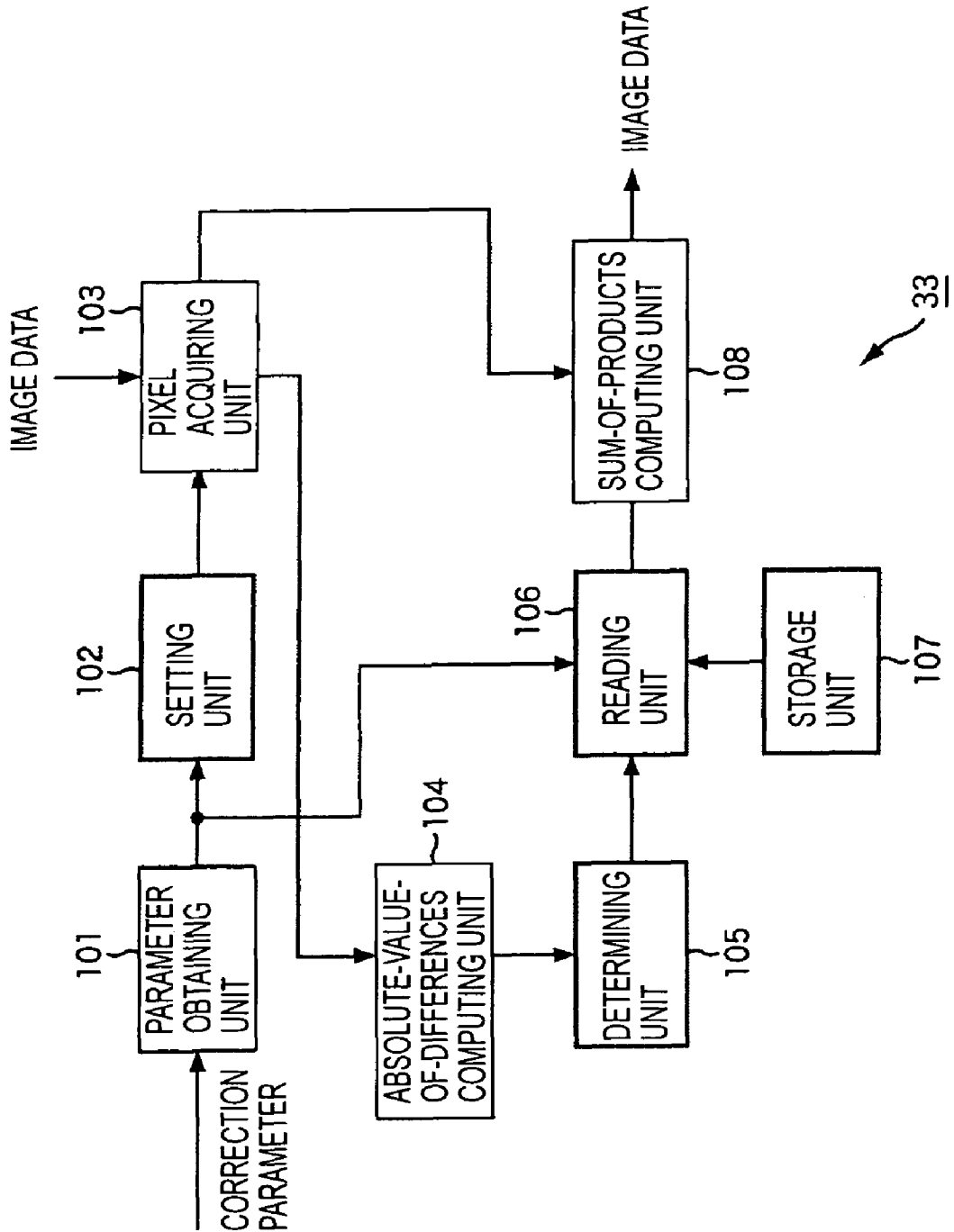
FIG. 22 is a block diagram illustrating a function type configuration example of the blurring correction unit of FIG. 10.

FIG. 22 represents a detailed configuration example of the blurring correction unit 33 in FIG. 10. This blurring correction unit 33 comprises a parameter acquiring unit 101, a setting unit 102, an image acquiring unit 103, an absolute-value-of-differences computing unit 104, a determining unit 105, a reading unit 106, a storage unit 107, and a sum-of-products computing unit 108.

The parameter acquiring unit 101 acquires the correction parameter that is output from the selecting unit 63 of the parameter correction unit 32, and provides this to the setting unit 102 and the reading unit 106. The setting unit 102 sets the observation region to a certain region of the image data, based on the correction parameter provided by the parameter acquiring unit 101. The pixel acquiring unit 103 acquires the image data within the observation region that is set by the setting unit 102 from the input image data, and provides this to the absolute-value-of-differences computing unit 104 and the sum-of-products computing unit 108.

The absolute-value-of-differences computing unit 104 computes the absolute-value-of-differences of the pixels supplied by the pixel acquiring unit 103. The determining unit 105 compares the value computed in the absolute-value-of-differences computing unit 104, and compares this to a previously set reference value. The storage unit 107 stores beforehand the coefficient $W_s^{-1}$ that is given in the Equation (19) that is obtained by solving the above Equations (10) through (17). The reading unit 106 reads out a fixed coefficient from the coefficients stored in the storage unit 107, based on the determining results of the determining unit 105. The sum-of-products computing unit 108 generates image data of an image wherein the blurring of the image is corrected, by performing sum-of-products calculations based on the Equation (19) with the pixel data $Y_s$ provided by the pixel acquiring unit 103 and the coefficient $W_s^{-1}$ provided by the reading unit 106.

Next, the blurring correction processing will be described referencing the flowcharts in FIGS. 23 and 24. This processing corresponds to the processing in step S32 in FIG. 12.

In step S101, the parameter acquiring unit 101 acquires the correction parameter output from the selecting unit 63 in FIG. 13, and outputs this to the setting unit 102 and the reading unit 106. In step S102, the setting unit 102 performs processing to set the observation region. Specifically, an observation region is set that has a radius of three times the value of the correction parameter σ (3σ) that is acquired by the parameter acquiring unit 101. In step S103, the pixel acquiring unit 103 acquires the pixel data of the observation region. In other words, the pixel data is acquired from within the observation region that is set by the setting unit 102, from the input image data, and outputs this to the absolute-value-of-differences computing unit 104 and the sum-of-products computing unit 108.

In step S104, the absolute-value-of-differences computing unit 104 computes the absolute-value-of-differences between the pixel of interest and the pixel adjacent to the pixel of interest vertically and horizontally. Specifically, the left sides of the above-described Equation (14) through Equation (17) are computed. In step S105, the determining unit 105 determines whether or not the absolute-value-of-difference between the pixel of interest and the pixel adjacent to the pixel of interest upward is greater than the reference value. In other words, whether or not the result of the calculation of the left side of the Equation (14) is greater or not than the previously set certain reference value is determined. In the case that the absolute-value-of-differences is greater than the reference value, the determining unit 105 sets the LSB of the 4-bit flag to 1 in step S106. If the absolute-value-of-differences is determined to be equal to or smaller than the reference value, the determining unit 105 sets the LSB flag to 0 in step S107.

In other words, the value of the left side of the Equation (14) being greater than the reference value means that edges exist on the upper direction of the pixel of interest. Therefore, in that case, a prediction coefficient is computed with the value of the weighted coefficient Ws in Equation (14) being set to 0 or a sufficiently small value. Then, the value of the LSB of the 4-bit flag is set to 1, in order to select the prediction coefficient thus generated.

Conversely, in the case that the absolute-value-of-differences is equal to or smaller than the reference value, because edges do not exist between the pixel of interest and the pixel immediately above the pixel of interest, the value of the weighted coefficient $W_a$ in Equation (14) computes the prediction coefficient after being set to a relatively high value, and then the prediction coefficient thereof is computed. Then, in this case, by setting the value of the LSB of the 4-bit flag to 0, the LSB of the flag is set to 0 so that the prediction coefficient is selected in the case that no edges exist between the pixel of interest and the pixel immediately above the pixel of interest.

In step S108, the determining unit 105 determines whether or not the absolute-value-of-difference between the pixel of interest and the pixel immediately below the pixel of interest is greater than the reference value. Specifically, whether or not the value on the left side of Equation (16) is greater than the reference value is determined, and in the case that it is greater, the determining unit 105 sets the second bit of the 4-bit flag to 1 in step S109, and in the case it is equal to or smaller than the reference value, the second bit of the flag is set to 0 in step S110. In other words, the value of the left side of the Equation (16) being greater than the reference value means that edges exist between the pixel of interest and the pixel immediately beneath. Therefore, in that case, the value of the weighted coefficient $W_a$ in Equation (16) is set to 0 or a sufficiently small value. Then, the second bit of the flag is set to 1, so as to be able to select the prediction coefficient computed in the case that edges exist between the pixel of interest and the pixel immediately beneath the pixel of interest. Conversely, in the case that the value of the left side of the Equation (16) is equal to or smaller than the reference value, no edges exist between the pixel of interest and the pixel immediately beneath the pixel of interest. Therefore, in this case, the value of the weighted coefficient $W_a$ in Equation (16) is set as a relatively large value, and therefore the second bit of the flag is set to 0, so as to be able to select the prediction coefficient calculated under the premise that edges do not exist between the pixel of interest and the pixel immediately beneath the pixel of interest.

Hereafter, similarly, in step S111, the determining unit 105 determines whether or not the absolute-value-of-difference between the pixel of interest and the pixel to the immediate left of the pixel of interest is greater than the reference value. In other words, whether or not the value on the left side of Equation (17) is greater than the reference value is determined, and in the case that it is greater, the determining unit 105 sets the third bit of the flag to 1 in step S112, and in the case it is equal to or smaller than the reference value, 0 is set in step S113. Thus, the flag is set so as to be able to select the prediction coefficient calculated for each of the cases wherein edges do and do not exist between the pixel of interest and the pixel immediately to the left of the pixel of interest.

In step S114, the determining unit 105 determines whether or not the absolute-value-of-difference between pixel of interest and the pixel to the immediate right of the pixel of interest is greater than the reference value. In the case that the absolute-value-of-differences is greater than the reference value, the determining unit 105 sets the MSB of the flag to 1 in step S115, and in the case that it is equal to or smaller than the reference value, 0 is set in step S116. Thus, in the case that the value shown on the left side of Equation (15) is greater than the reference value (in the case that edges exist), the prediction coefficient computed by setting the value of the weighted coefficient $W_a$ in Equation (15) to 0 or a sufficiently small value can be selected, and conversely, in the case that the value shown on the left side of Equation (15) is equal to or smaller than the reference value (in the case that edges do not exist between the pixel of interest and the pixel immediately to the right of the pixel of interest), the flag is set so as to be able to select the prediction coefficient calculated under this premise.

In step S117, the reading unit 106 reads out the coefficient corresponding to the flag and correction parameter. In other words, in the case of the present embodiment, the storage unit 107 stores a total of 16 types of prediction coefficients corresponding to the correction parameter σ, combining the cases wherein edges do or do not exist between the pixel of interest and the pixel immediately above the pixel of interest, the cases wherein edges do or do not exist between the pixel of interest and the pixel immediately below the pixel of interest, the cases wherein edges do or do not exist between the pixel of interest and the pixel immediately to the left of the pixel of interest, and the cases wherein edges do or do not exist between the pixel of interest and the pixel immediately to the right of the pixel of interest. The reading unit 106 reads out the prediction coefficient corresponding to the flag and correction parameter from the 16 types of prediction coefficients, based on the correction parameter σ acquired in step S101, from the parameter acquiring unit 101 and the flag determined by the determining unit 105.

The sum-of-products computing unit 108 computes the sum of products of the pixel value and the coefficient in step S118. Specifically, the sum-of-products computing unit 108 computes the sum of products of the prediction coefficient supplied by the reading unit 106 and the pixel value supplied by the pixel acquiring unit 103, according to Equation (19), and generates the image data. This prediction coefficient is a coefficient to correct the blurring, as described above, and therefore the image data wherein the blurring of the image is corrected is generated by this computation.

Figure 25:
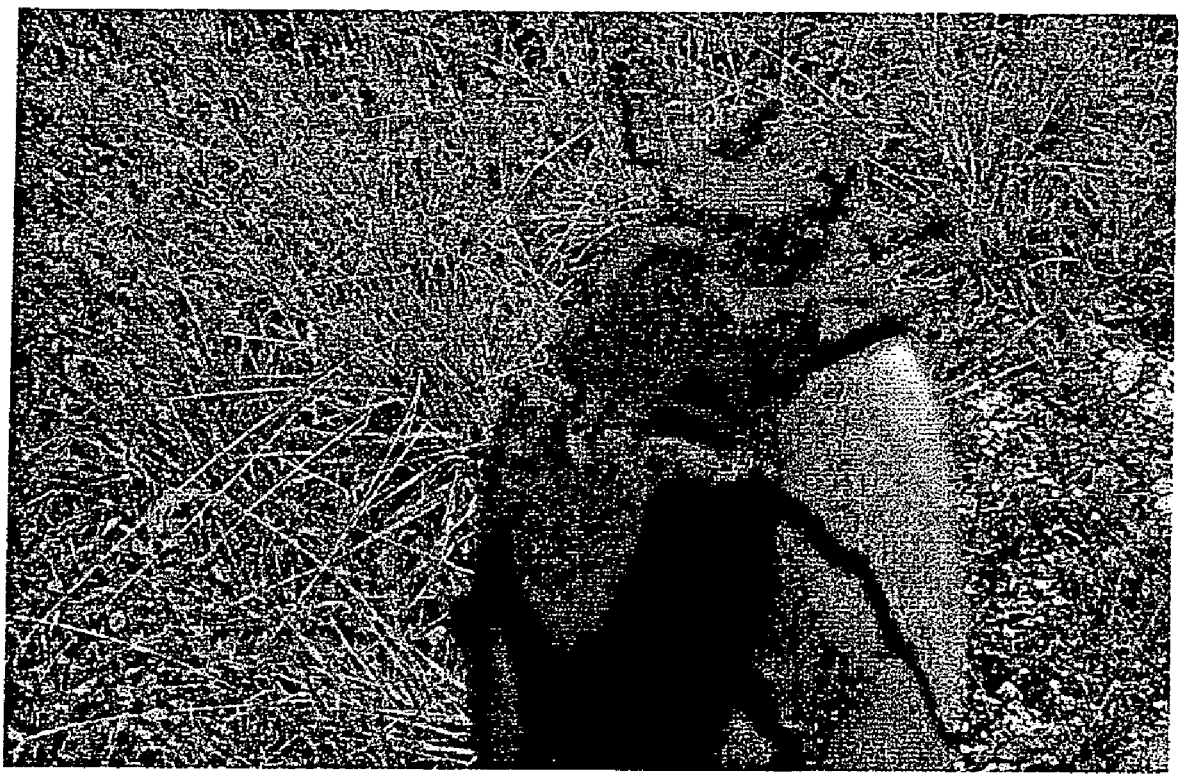
FIG. 25 is a photograph illustrating an example of an image prior to blurring correcting.
Figure 26:
FIG. 26 is a photograph illustrating an example of an image wherein the blurring has been corrected.
Figure 27:
FIG. 27 is a photograph illustrating an example of an image wherein the blurring has been corrected.

FIGS. 25 through 27 represent examples of an image wherein the blurring has been corrected. FIG. 25 shows an example of an image prior to correction, and in this image, the focus is on the background grass, and therefore the background is a clear image, but the insect in the foreground is an out of focus image.

FIG. 26 shows an example of an image wherein the blurring is corrected without correcting the user-specified parameter σ. In this example, the blurring of the image in the foreground is corrected, but results in overshooting or ringing in the background image.

FIG. 27 shows an example of an image wherein the blurring is corrected according to the present invention. As illustrated in this figure, according to the present invention, deterioration such as overshooting or ringing of the background can be suppressed even if the user sets the value of the parameter σ too high because it is corrected to a much smaller value, as described above. Then of course, the blurring in the foreground is also sufficiently corrected compared to the case illustrated in FIG. 25.

Figure 28:
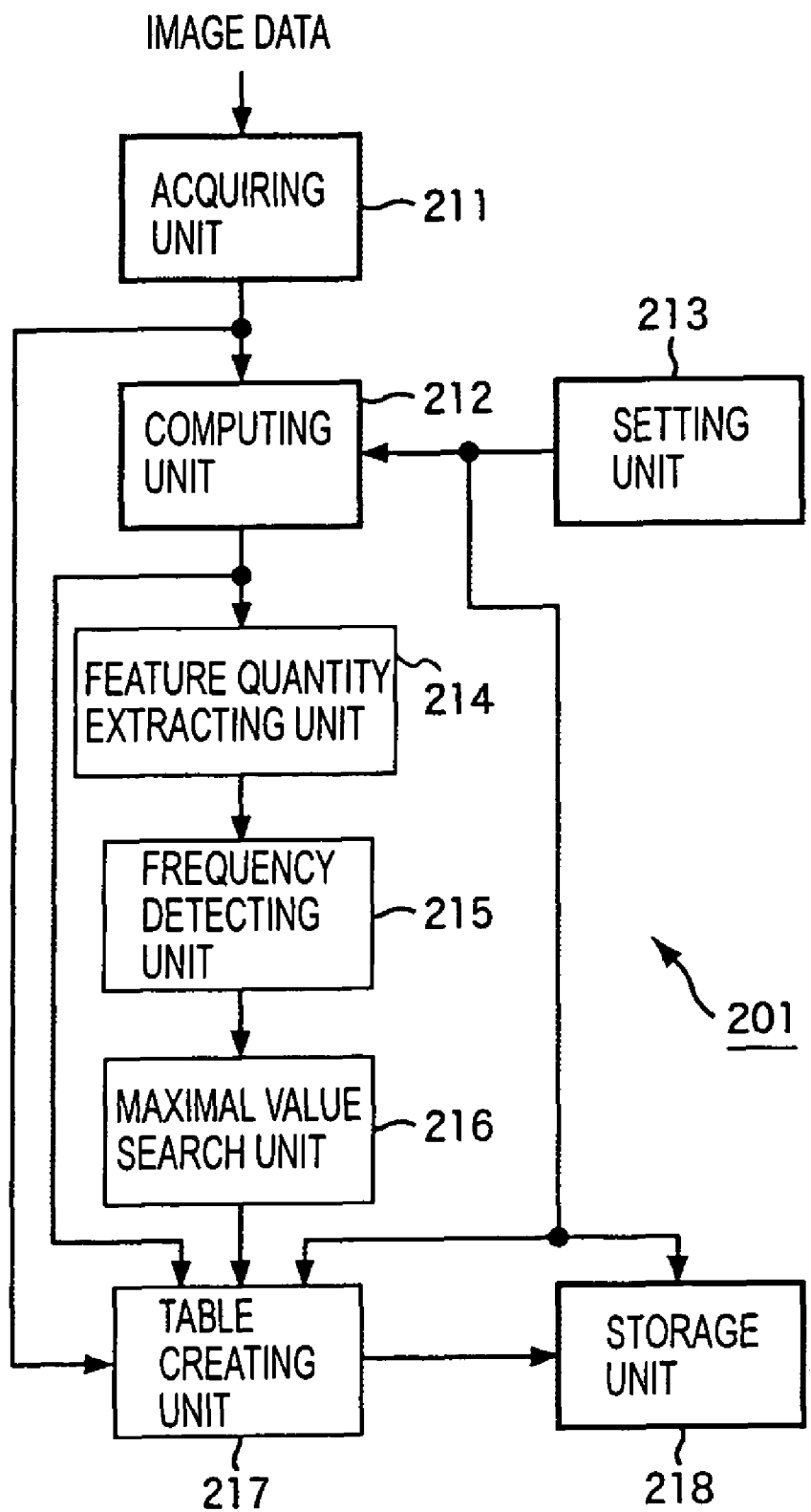
FIG. 28 is a block diagram illustrating a functional configuration example of the look-up table creating device.

The look-up tables 62-1 through 62-4 in FIG. 13 are created by for example the look-up table creating device 201 illustrated in FIG. 28. This look-up table creating device 201 comprises an acquiring unit 211, a computing unit 212, a setting unit 213, a feature quantity extracting unit 214, a frequency detecting unit 215, a maximal value search unit 216, a table creating unit 217, and a storage unit 218.

The acquiring unit 211 acquires the image data for learning, and outputs this to the computing unit 212. The setting unit 213 normally sets the parameter σ based on the operation of an operator at the manufacturer of the image processing device 1 illustrated in FIG. 1. The computing unit 212 generates the image data of the blurred image from the image data provided by the acquiring unit 211, based on the parameter σ set by the setting unit 213. Specifically, the blurred image data is generated, based on the above-described Equation (1). The feature quantity extracting unit 214 extracts the feature quantity identical to the feature quantity extracting units 71-1 through 71-4 in FIG. 13. The frequency detecting unit 215 detects the frequency of the feature quantity extracted by the feature quantity extracting unit 214. The maximal value search unit 216 searches for the maximal value from the feature quantities that have a frequency above the beforehand set threshold.

The table creating unit 217 sets the estimated parameter, based on the value of the parameter σ set by the setting unit 213 and the maximal value searched out by the maximal value search unit 216. The storage unit 218 stores the table created by the table creating unit 217 into memory and so forth that is provided beforehand.

Figure 29:
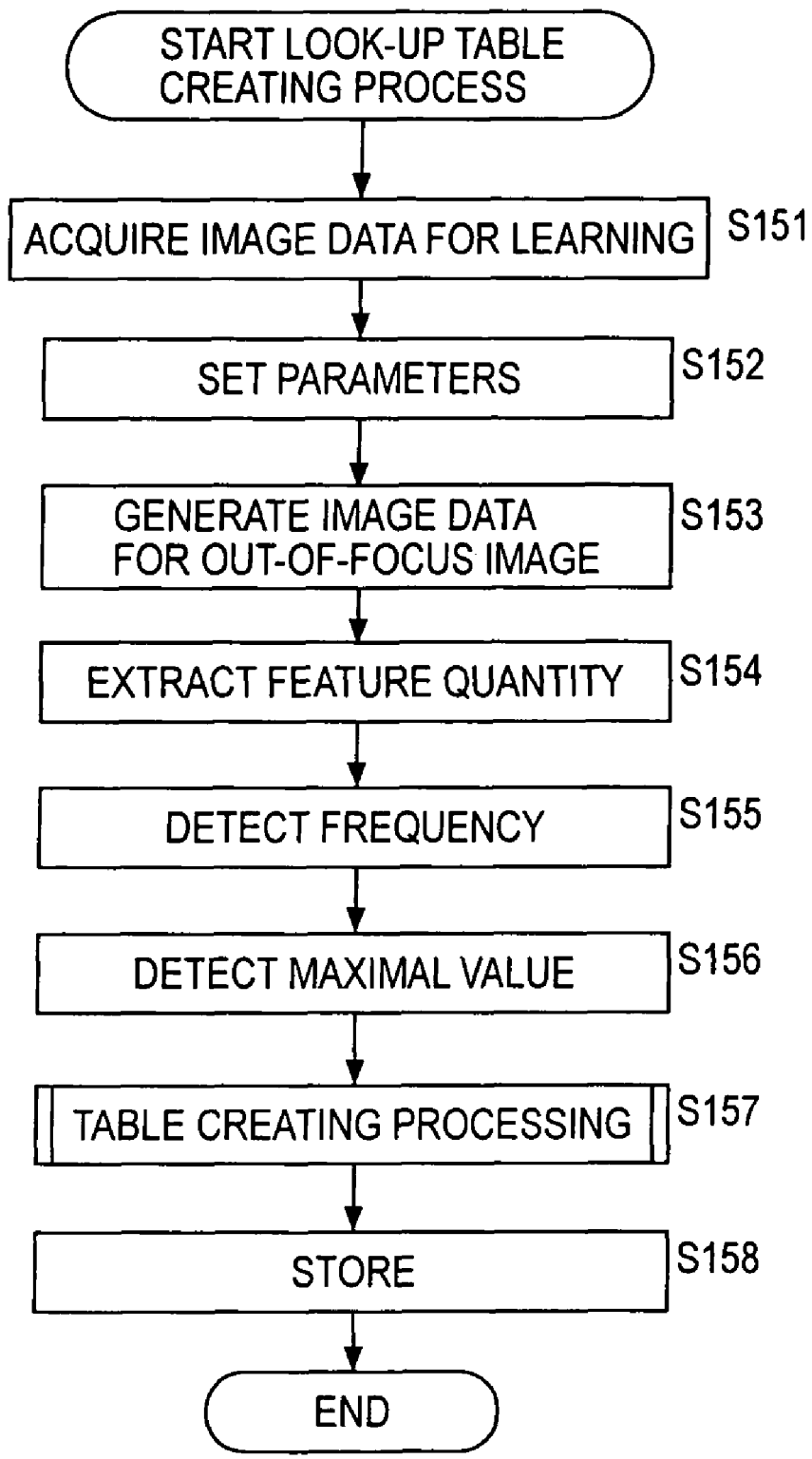
FIG. 29 is a flowchart describing the look-up table creating processing of the look-up table creating device of FIG. 28.

Next, the look-up table creating processing will be described referencing the flowchart in FIG. 29.

In step S151, the acquiring unit 211 acquires the image data for learning. As image data for learning, the image data of a large number of multiple images that are not blurred are prepared, and these are acquired. In step S152, the setting unit 213 sets the parameter σ. In other words, the setting unit 213 outputs the value of the parameter σ based on the operation of the operator to the computing unit 212. In step S153, the computing unit 212 generates the image data of the blurred image. Specifically, the setting processing in step S152 applies the value of the parameter σ set by the setting unit 213 to Equation (1) and Equation (2), and generates the image data Y (x, y) of the blurred image from the image data X (x+i, y+j) of the images that are not blurred.

In step S154, the feature quantity extracting unit 214 extracts the feature quantity. In other words, the same feature quantity is extracted as the case that the feature quantity extracting units 71-1 through 71-4 in FIG. 13 extracts from the image data of the blurred image computed by the computing unit 212.

Figure 30:
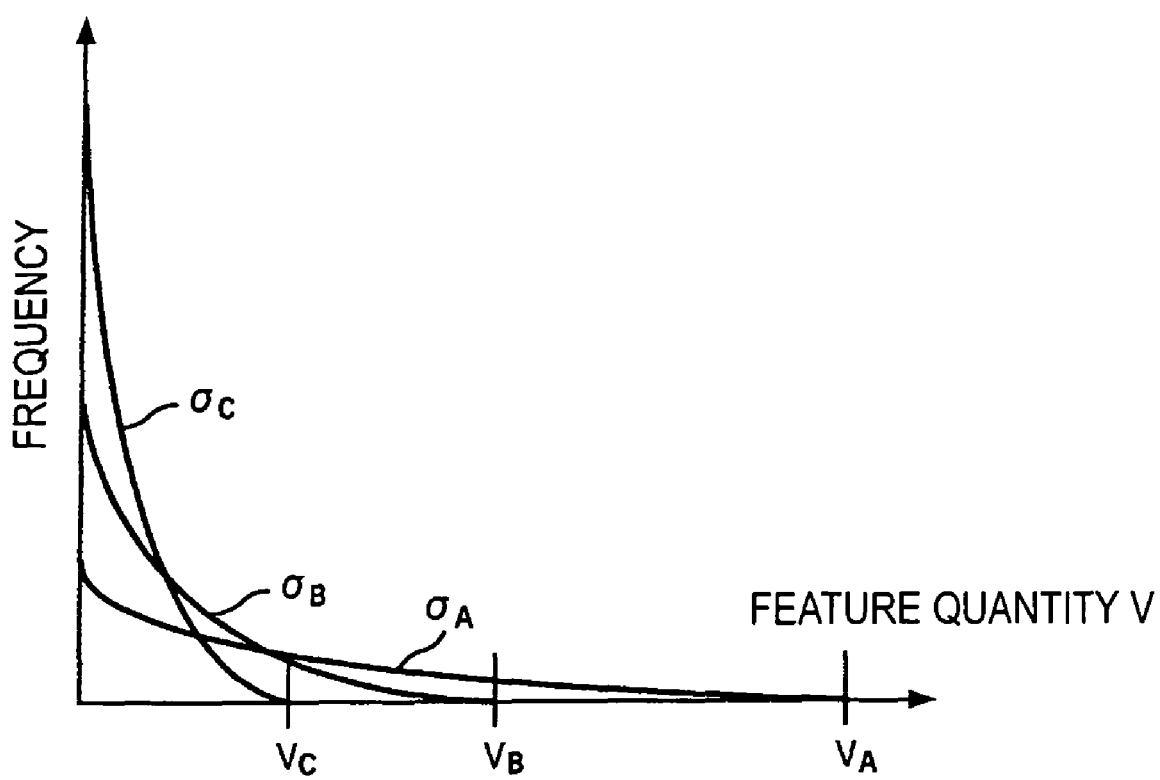
FIG. 30 is a diagram describing the relationship between the feature quantity, the frequency, and the parameter σ.

In step S155, the frequency detecting unit 215 detects the frequency. That is to say, the frequency of obtaining the same feature quantity is detected. Thus, a feature distribution for each feature quantity, such as shown in FIG. 30, is obtained. The example in FIG. 30 shows frequency distribution examples for a case wherein the parameter set by the setting unit 213 is $\sigma_A$, a case wherein the parameter is $\sigma_B$, and a case wherein the parameter is $\sigma_C$.

In step 156, the maximal value search unit 216 searches for the maximal value of the feature quantity for each parameter σ. In the example of FIG. 30, the maximal value of the feature quantity of $V_A$ in the case that the set parameter value is $\sigma_A$, the maximal value of the feature quantity of $V_B$ in the case that the set parameter value is $\sigma_B$, and the maximal value of the feature quantity of $V_C$ in the case that the set parameter value is $\sigma_C$ are each searched out.

Now, the maximal value of the feature quantity may be selected from the frequency wherein the frequency thereof is greater than a certain reference value provided beforehand. Thus, based on the feature quantity with noise, incorrect corrections can be avoided.

In step S157, the table creating unit 217 executes a table creating processing. The details thereof will be described below while referencing the flowchart in FIG. 31, but the look-up table is created based on this processing. In step S158, the storage unit 218 stores the table created by the table creating unit 217 in the processing of step S157. In other words, the storage unit 218 writes the look-up table into the memory provided beforehand. This look-up table is used as the look-up tables 62-1 through 62-4 of the parameter correction unit 32 in the above-described FIG. 13.

Figure 31:
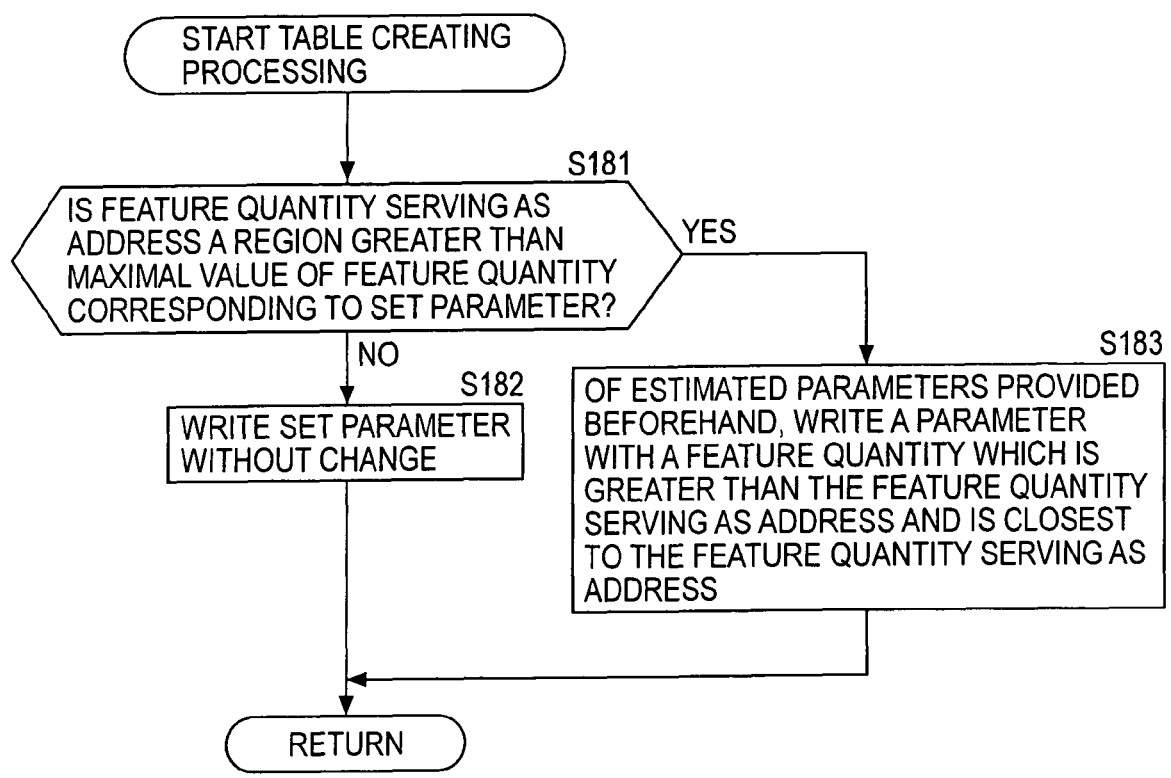
FIG. 31 is a flowchart describing the details of the table creating processing in Step S157 of FIG. 29.

Next, the table creating processing of step S157 in FIG. 29 will be described referencing the flowchart in FIG. 31.

In step S181, the table creating unit 217 determines whether or not the feature quantity serving as the address has a region greater than the maximal value of the feature quantity corresponding to the parameter set in step S152. In the case that the region is equal to or smaller than the maximal value of the feature quantity corresponding to the parameter setting the feature quantity serving as an address, the table creating unit 217 executes writing processing of the set parameter value into that region without change in step S182.

For example, in the case that the value of the parameter currently set is the parameter $\sigma_{70}$ in FIG. 16, and the value of the feature quantity serving as the address (the feature quantity illustrated on the horizontal axis in FIG. 16) is for example $V_{80}$, the value $V_{80}$ is smaller than the maximal value $V_{70}$ of the feature quantity corresponding to the parameter $\sigma_{70}$ ($V_{80} < V_{70}$). Therefore, in this case, the parameter value $\sigma_{70}$ is written into the frame of the parameter $\sigma_{70}$ in FIG. 16, without change.

However, in the case that the region is greater than the maximal value of the feature quantity corresponding to the parameter setting the feature quantity serving as an address in step S181, the table creating unit 217 writes a parameter, of the estimated parameters provided beforehand, that is greater than the feature quantity serving as the address and is closest to the feature quantity serving as the address in step S183. For example, in the example in FIG. 16, three estimated parameters $\sigma_{70}$, $\sigma_{50}$, and $\sigma_{30}$ have been provided beforehand. The maximal values of the feature amount corresponding to these parameters are $V_{70}$, $V_{50}$, and $V_{30}$, respectively, as illustrated in FIG. 17.

In the case that the value of the feature quantity serving as the address is for example $V_{60}$, this value $V_{60}$ is greater than the maximal value $V_{70}$ corresponding to the parameter $\sigma_{70}$. Therefore, YES is determined in the processing of step S181. The parameter with the maximal feature quantity of maximal value $V_{50}$ that corresponds to the parameter provided beforehand that is greater than the feature quantity $V_{60}$ serving as the address and is closest to this value $V_{60}$ is the parameter $\sigma_{50}$ (the maximal value $V_{70}$ corresponding to the parameter $\sigma_{70}$ is small than the $V_{60}$ serving as the address, and the maximal value $V_{30}$ corresponding to the parameter $\sigma_{30}$ is further from the maximal value $V_{50}$ corresponding to the parameter $\sigma_{50}$). Therefore, in this case, the parameter $\sigma_{50}$ is written into the region of the feature quantity $V_{60}$ serving as the address.

In the case that the value of parameter $\sigma$ is $\sigma_{70}$, and the feature quantity serving as the address is $V_{70}$, the parameter with a maximal feature quantity closest to the feature quantity $V_{40}$ serving as the address and that is greater than the feature quantity $V_{40}$ serving as the address is the parameter $\sigma_{30}$ with the maximal feature quantity of value $V_{30}$. Therefore, the parameter $\sigma_{30}$ is written into the region of the feature quantity $V_{40}$ serving as the address. Thus, the look-up table illustrated in FIG. 16 is created.

Now, an example has been described above wherein the focus blurring is corrected, but the present invention can also be applied to the case of movement blurring. The following embodiment shows image signal processing for correction of blurring due to motion.

Figure 32:
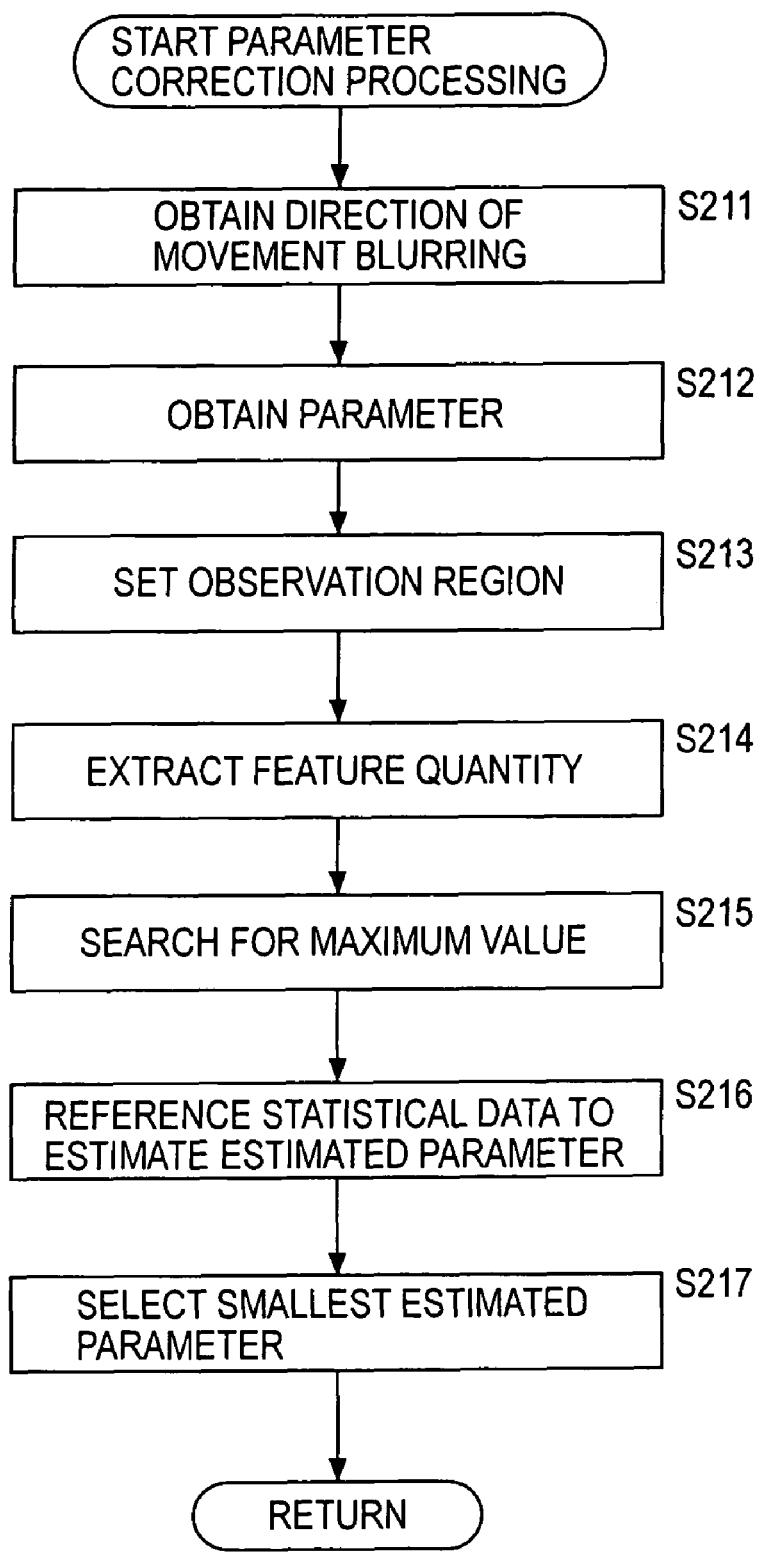
FIG. 32 is a flowchart describing parameter correction processing in step S31 of FIG. 12 in the case of correction of movement blurring.

The processing for correcting movement blurring and the functional blocks for executing the processing is basically the same as the case for out-of-focus correction, but in the event of correcting movement blurring, the parameter correcting processing shown in FIG. 14 for the case for out-of-focus correction is as shown in FIG. 32.

Figure 33:
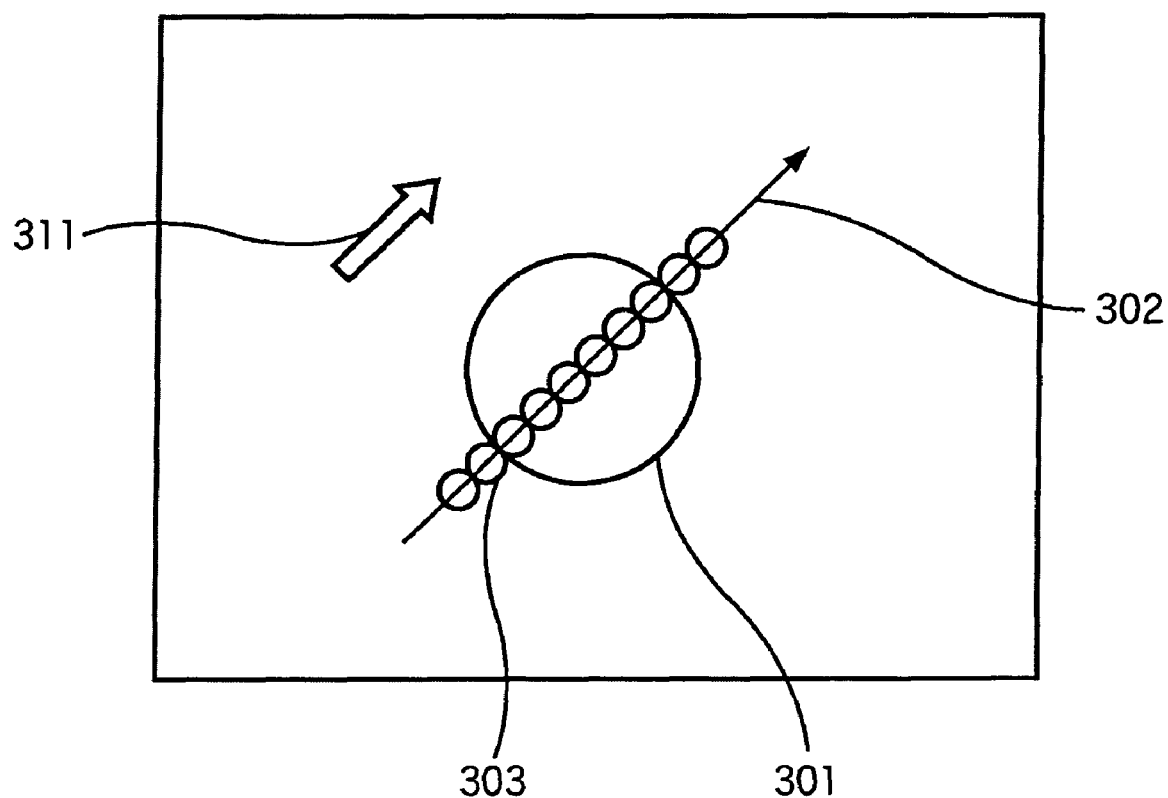
FIG. 33 is a diagram for describing the direction of movement blurring correction.

In step S211, the user interface unit 31 acquires the direction and magnitude of movement blurring. That is to say, the user inputs the direction (the direction for performing correction of the movement blurring) and magnitude of movement blurring while viewing an image displayed on the display device 12. This input can be arranged to be made by operating the knob 51 of the user interface unit 31, for example, or operating a mouse or the like. In this case, as shown in FIG. 33 for example, the image to be corrected is superimposed on the image, a cursor 311 indicating the direction is displayed on the display device 12, the cursor 311 is rotated according to the direction and rotational amount of the operation of the knob 51 by the user, and finally the direction in which the cursor 311 is pointing is obtained as the direction for performing movement blurring processing. Or, one direction selected by the user from eight directions prepared beforehand, i.e., up, down, left, right, upper right, lower right, upper left, and lower left (of course, more directions than this may be provided) may be obtained as the direction for performing movement blurring processing. Also, a separate knob from the knob 51 can be provided for inputting the magnitude. Or, the magnitude value may be input from a keyboard, or may be input from a mouse by dragging the mouse so as to specify a magnitude corresponding to how far the mouse was dragged.

In step S212, the user interface unit 31 obtains a parameter for correcting movement blurring. As disclosed in Japanese Unexamined Patent Application Publication No. 2001-250119, a model can be generated for movement blurring by computing the sum of pixel values of a number corresponding to the movement of the object. Accordingly, the movement blurring can be adjusted by controlling the number of pixels which are the object of computation with a parameter P. the user interface unit 31 obtains the value of the parameter P which the user has input. That is to say, the magnitude of the movement blurring input by the user corresponds to this parameter P. The obtained parameter P is supplied to the feature quantity extracting units 71-1 through 71-4 and look-up tables 62-1 through 62-4, along with the direction obtained in step s211.

In step S213, the feature quantity extracting units 71-1 through 71-4 set observation regions. That is to say, first, the feature quantity extracting units 71-1 through 71-4 set a region corresponding to the parameter P obtained by the processing in step S212. Specifically, a region corresponding to the parameter P obtained for the direction matching the obtained direction (including directions wherein any offset is within a threshold value, as well as perfect matches) is taken as the observation region.

For example, as shown in FIG. 33, in a case of correcting movement blurring of a moving object 301, in the event that the movement vector in the direction matching the obtained direction is that of the arrow 302, as many pixels as correspond to the parameter P of the pixels 303 including the pixel of interest are set as the observation region.

Next, in step S214, the feature quantity extracting units 71-1 through 71-4 extract the feature quantities. As described above, the feature quantity each extract a feature quantity which is assigned to itself and is different from the others. This processing is the same as the processing in step S53 shown in FIG. 14.

In step S215, the maximal value search units 72-1 through 72-4 search for the maximal values (feature quantities where blurring is minimal). With the feature quantity extracting unit 71-1 extracting the primary derivative value as the feature quantity, the feature quantity extracting unit 71-2 extracting the secondary derivative value as the feature quantity, the feature quantity extracting unit 71-3 extracting the dynamic range derivative value as the feature quantity, and the feature quantity extracting unit 71-4 extracting dispersion as the feature quantity, the maximal value search unit 72-1 searches for the maximal value of the primary derivative value of the pixels within the observation region extracted by the feature quantity extracting unit 71-1. The maximal value search unit 72-2 searches for the maximal value of the secondary derivative value of the pixels within the observation region extracted by the feature quantity extracting unit 71-2. The maximal value search unit 72-3 searches for the maximal value of the dynamic range of the pixels within the observation region extracted by the feature quantity extracting unit 71-3. The maximal value search unit 72-4 searches for the dispersion of the pixels within the observation region extracted by the feature quantity extracting unit 71-4.

Figure 34:
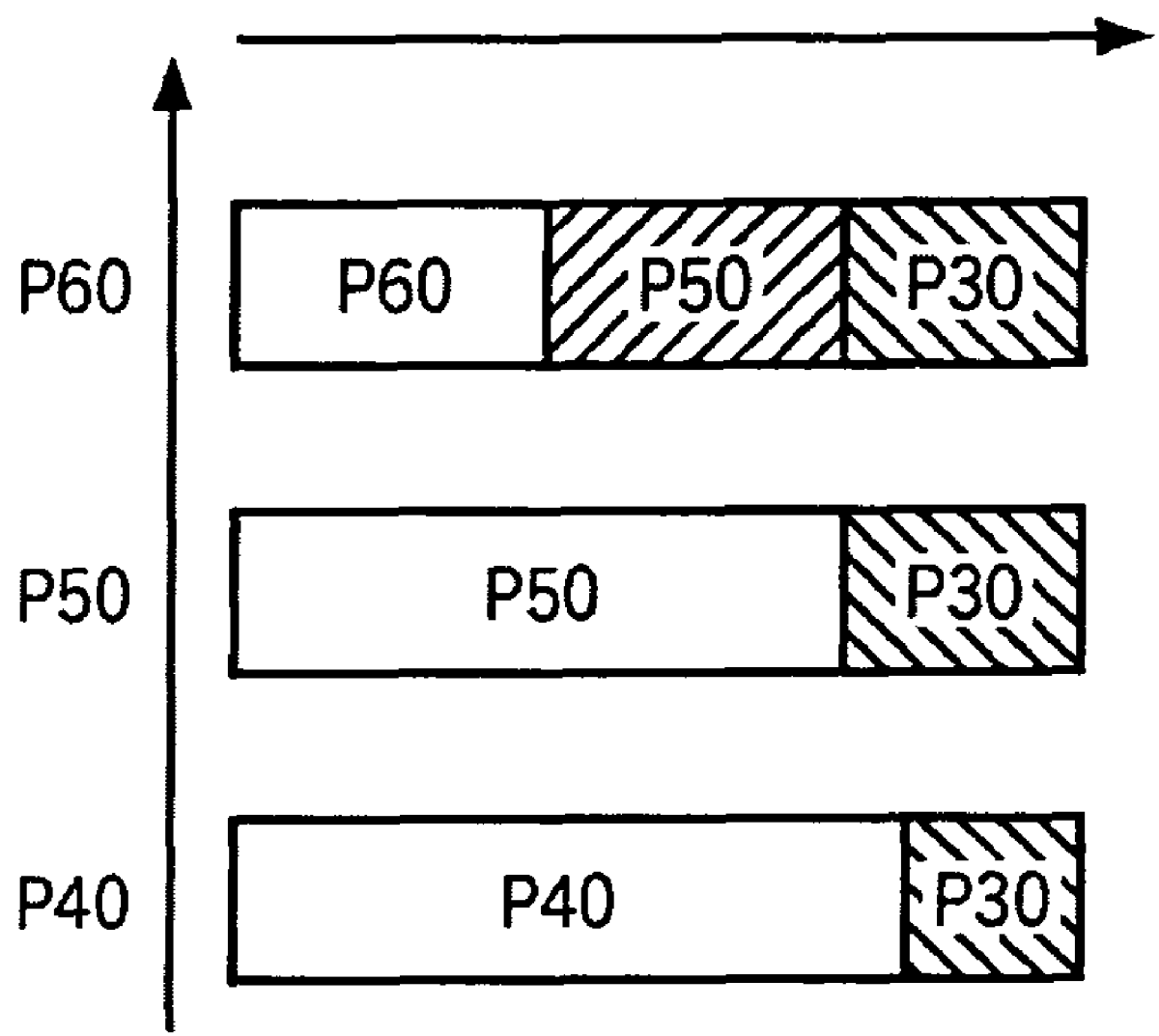
FIG. 34 is a diagram illustrating an example of a look-up table in a case of correcting movement blurring.

In step S216, the look-up tables 62-1 through 62-4 estimate estimated parameters with reference to statistical data. That is to say, the look-up tables 62-1 through 62-4 have tables. FIG. 34 illustrates an example of such a table. The table shown in FIG. 34 differs from that in FIG. 16 only in that the value of the parameter on the vertical axis is parameter P in FIG. 34 whereas this is parameter σ in FIG. 16; otherwise, the table in FIG. 34 is basically the same as that in FIG. 16. The look-up tables 62-1 through 62-4 convert the obtained parameter P into an estimated parameter, based on the table. The basic processing thereof is the same as that in step S55 in FIG. 14. That is to say, in the event that the maximal value of the feature quantity corresponding to the value of the parameter P which the user has specified is smaller than the maximal value searched with the maximal value search units 72-1 through 72-4, the parameter P is changed to an estimated parameter corresponding to the maximal value of a value greater than the maximal value searched by the maximal value search units 72-1 through 72-4.

In step S217, the selecting unit 63 executes processing for selecting the smallest estimated parameter from the estimated parameters output by the look-up tables 62-1 through 62-4. That is to say, the magnitude of the four estimated parameters output from the look-up tables 62-1 through 62-4 is compared, the one smallest estimated parameter (the parameter with the smallest movement blurring) is selected, and output as the correction parameter. Thus, the parameter P which the user has specified is converted (corrected) to the correction parameter.

Other processing in the case of correcting movement blurring is basically the same as with the case of out-of-focus correction, and accordingly description thereof will be omitted.

Further, with the above, the parameter σ or parameter P is set to be corrected based on the look-up table, but certainly can be computed for each instance.

The above-described series of processes can be carried out either by hardware or software. In this case, the image processing device is comprised of a personal computer 420, for example, as illustrated in FIG. 35.

In FIG. 35, the CPU (Central Processing Unit) 421 executes each type of processing following the program stored in the ROM (Read Only Memory) 422 or the program loaded into the RAM (Random Access Memory) 423 from the storage unit 428. The RAM 423 appropriately stores the necessary data for the CPU 421 to execute the various processes.

The CPU 421, the ROM 422, and the RAM 423 are mutually connected via a bus 424. This bus 424 is also connected to an input/output interface 425.

The input/output interface 425 is connected to an input unit 426 such as a keyboard or mouse, a display such as a CRT (Cathode Ray Tube) or a LCD (Liquid Crystal display), an output unit 427 such as a speaker, a storage unit 428 configured of a hard disk and so forth, and a communication unit 429 such as a modem. The communication unit 429 performs the communication process via a network including the Internet.

The input/output interface 425 is also connected to the drive 430 as necessary, and removable media 431 such as a magnetic disk, an optical disk, a magneto-optical disk, or semiconductor memory are attached as appropriate, the computer program read out thereof is installed into the storage unit 428 as necessary.

In the case of executing the series of processes by software, the program comprising that software is installed from a network or recording medium to a general purpose personal computer that is capable of executing various functions by installing various programs or to a computer with dedicated hardware.

This recording medium comprises not only removable media 431 such as a magnetic disk (including a floppy disk), an optical disk (including a CD-ROM (Compact Disk-Read Only Memory) and a DVD (Digital Versatile Disk), a magneto-optical disk (including a MD (Mini-Disk)), or semiconductor memory, apart from the device main unit, as illustrated in FIG. 35, that is distributed in order to provide programs to the users, but also comprises ROM 422 wherein the program is recorded, or a hard disk that is included in the storage unit 428 that is provided to the user by being integrated into the device main unit.

Now, according to the present description, the steps that specify the program that is recorded onto the recording medium include not only processing performed in the order described in a time series, but also the process that is executed individually or in parallel, not necessarily in a time series.

Applications of the present invention include a digital camera, for example.

The present application contains subject matter related to Japanese patent application No. JP2004-173086, filed in the Japanese Patent Office on Jun. 10, 2004, the entire contents of which are incorporated herein by reference.

The invention claimed is:

1. An image processing device, comprising:
parameter acquiring means for acquiring a parameter corresponding to a deblurring amount of an image to be deblurred, wherein the parameter acquiring means includes a user interface unit configured to acquire the parameter from user input to the user interface unit;
feature quantity detecting means for detecting a feature quantity of said image to be deblurred;
parameter correcting means for correcting the parameter acquired by the user interface unit based on both (1) a value of the detected feature quantity, and (2) a value of the parameter acquired by the user interface unit, wherein, when a first feature quantity as a maximal value of said feature quantity of said image to be deblurred is smaller than a second feature quantity as said maximal feature quantity that corresponds to said acquired parameter, said parameter correcting means does not change said acquired parameter, and when the first feature quantity is larger, the acquired parameter is set to said parameter that corresponds as the maximal feature quantity of a third feature quantity as a feature quantity greater than said first feature quantity; and deblurring means for correcting the blurring of said image to be deblurred based on the parameter corrected by the parameter correcting means.

2. An image processing device according to claim 1, wherein said feature quantity detecting means detects the activity of said image to be deblurred as said feature quantity.

3. An image processing device according to claim 2, wherein said feature quantity detecting means detects at least one of a primary differential value, a secondary differential value, a dynamic range of pixel values of said image, and a dispersion of pixel values of said image to be deblurred as the activities.

4. An image processing device according to claim 1, wherein said feature quantity detecting means detects multiple feature quantities;
said parameter correcting means generates multiple correction parameters corresponding to said multiple feature quantities;
the image processing device further comprises correction parameter selection means that selects the smallest of said multiple correction parameters; and
said deblurring means corrects the blurring of an image to be deblurred based on the selected correction parameter.

5. An image processing device according to claim 1, wherein said feature quantity detecting means detects a maximal value of said feature quantity of multiple pixels within one portion of a region of the image to be deblurred as said feature quantity.

6. An image processing device according to claim 5, wherein said deblurring means sets the one portion of the region of said image to be deblurred to a size based on the value of the acquired parameter.

7. An image processing device according to claim 1, wherein said deblurring means corrects the blurring of said image to be deblurred using the difference between pixel values of adjacent pixels.

8. An image processing device according to claim 7, wherein said deblurring means compares said difference to a reference value and determines an edge direction, and the difference of the direction that has said edge is utilized with a smaller proportion compared to the difference in a direction without an edge.

9. The image processing device of claim 1, wherein said parameter acquiring means comprises means for acquiring the parameter relating to correction of blurring of the image due to an out-of-focus condition.

10. The image processing device of claim 1, wherein said parameter acquiring means comprises means for acquiring the parameter relating to correction of blurring of the image due to motion.

11. The image processing device of claim 1, wherein the user interface unit is configured to acquire a scalar value as the acquired parameter.

12. The image processing device of claim 1,
wherein the parameter correcting means corrects the parameter acquired by the user interface unit by accessing a table of correction parameters with both the value of the parameter acquired by the user interface unit and the value of the detected feature quantity.

13. An image processing method, comprising:
acquiring, from user input to a user interface unit, a parameter corresponding to a deblurring amount of an image to be deblurred;
detecting a feature quantity of said image to be deblurred;
correcting the parameter acquired by the user interface unit based on both (1) a value of the detected feature quantity, and (2) a value of the parameter acquired by the user interface unit, wherein, when a first feature quantity as a maximal value of said feature quantity of said image to be deblurred is smaller than a second feature quantity as said maximal feature quantity that corresponds to said acquired parameter, said acquired parameter is not changed, and when the first feature quantity is larger, the acquired parameter is set to said parameter that corresponds as the maximal feature quantity of a third feature quantity as a feature quantity greater than said first feature quantity; and
correcting the blurring of said image to be deblurred based on the corrected parameter.

14. A non-transitory computer readable medium that stores a program configured to be read by a computer and when executed by the computer, causes the computer to correct blurring of an image, said program comprising:
instructions for acquiring, from user input to a user interface unit, a parameter corresponding to a deblurring amount of an image to be deblurred;
instructions for detecting a feature quantity of said image to be deblurred;
instructions for correcting the parameter acquired by the user interface unit based on both (1) a value of the detected feature quantity, and (2) a value of the parameter acquired by the user interface unit, wherein, when a first feature quantity as a maximal value of said feature quantity of said image to be deblurred is smaller than a second feature quantity as said maximal feature quantity that corresponds to said acquired parameter, said acquired parameter is not changed, and when the first feature quantity is larger, the acquired parameter is set to said parameter that corresponds as the maximal feature quantity of a third feature quantity as a feature quantity greater than said first feature quantity; and
instructions for correcting the blurring of said image to be deblurred based on the corrected parameter.

15. An image processing device, comprising:
a user interface unit configured to acquire, from user input to the user interface unit, a parameter corresponding to a deblurring amount of an image to be deblurred;
a feature quantity detecting unit configured to detect a feature quantity of said image to be deblurred;
a parameter correcting unit configured to correct the parameter acquired by the user interface unit based on both (1) a value of the detected feature quantity, and (2) a value of the parameter acquired by the user interface unit, wherein, when a first feature quantity as a maximal value of said feature quantity of said image to be deblurred is smaller than a second feature quantity as said maximal feature quantity that corresponds to said acquired parameter, said parameter correcting unit does not change said acquired parameter, and when the first feature quantity is larger, the acquired parameter is set to said parameter that corresponds as the maximal feature quantity of a third feature quantity as a feature quantity greater than said first feature quantity; and
a blurring correction unit configured to correct the blurring of said image to be deblurred based on the parameter corrected by the parameter correcting unit.

* * * * *